US009441120B2

(12) United States Patent
Jung et al.

(10) Patent No.: US 9,441,120 B2
(45) Date of Patent: Sep. 13, 2016

(54) LITHOGRAPHIC OFFSET INKS WITH WATER AND FILLER CONTENT

(71) Applicant: SUN CHEMICAL CORPORATION, Parsippany, NJ (US)

(72) Inventors: Reiner Jung, Aschaffenburg (DE); Jochen Gattermayer, Messel (DE); Kai-Uwe Gaudl, Alzenau (DE); Ramasamy Krishnan, North Brunswick, NJ (US); Lars Keller, Hesse (DE); Cumhur Bilgic, Istanbul (TR); Jeff Jones, Chicago, IL (US); Jeff Newton, Oswego, IL (US); Adelbert Dettling, Johannesberg (DE); Russell Schwartz, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 14/407,216

(22) PCT Filed: Jun. 14, 2013

(86) PCT No.: PCT/US2013/045845
§ 371 (c)(1),
(2) Date: Dec. 11, 2014

(87) PCT Pub. No.: WO2013/188746
PCT Pub. Date: Dec. 19, 2013

(65) Prior Publication Data
US 2015/0184004 A1 Jul. 2, 2015

Related U.S. Application Data

(60) Provisional application No. 61/660,159, filed on Jun. 15, 2012, provisional application No. 61/726,172, filed on Nov. 14, 2012, provisional application No. 61/773,204, filed on Mar. 6, 2013, provisional application No. 61/789,226, filed on Mar. 15, 2013.

(51) Int. Cl.

| | |
|---|---|
| *C09D 11/023* | (2014.01) |
| *C09D 11/108* | (2014.01) |
| *C09D 11/103* | (2014.01) |
| *C09D 11/101* | (2014.01) |
| *C09D 11/102* | (2014.01) |
| *B41M 3/00* | (2006.01) |
| *B41M 1/06* | (2006.01) |
| *B41M 7/00* | (2006.01) |

(52) U.S. Cl.
CPC .............. *C09D 11/023* (2013.01); *B41M 1/06* (2013.01); *B41M 3/00* (2013.01); *B41M 7/009* (2013.01); *B41M 7/0081* (2013.01); *C09D 11/101* (2013.01); *C09D 11/102* (2013.01); *C09D 11/103* (2013.01); *C09D 11/108* (2013.01); *Y10T 428/24901* (2015.01)

(58) Field of Classification Search
CPC . C09D 11/023; C09D 11/108; C09D 11/103; C09D 11/101; B41F 7/02
See application file for complete search history.

(56) References Cited

U.S. PATENT DOCUMENTS

| | | | |
|---|---|---|---|
| 5,693,255 A | 12/1997 | Okamoto et al. | |
| 6,331,203 B2 | 12/2001 | Hattori et al. | |
| 2002/0083865 A1* | 7/2002 | Krishnan et al. | 106/31.6 |
| 2002/0098997 A1 | 7/2002 | Audibert-Hayet et al. | |
| 2003/0119941 A1 | 6/2003 | Batting et al. | |
| 2003/0176526 A1 | 9/2003 | Weissman | |
| 2006/0001726 A1* | 1/2006 | Kodas et al. | 347/105 |
| 2007/0161736 A1 | 7/2007 | Sare et al. | |
| 2007/0225397 A1* | 9/2007 | Nasvadba et al. | 522/167 |
| 2008/0139743 A1 | 6/2008 | Krishnan et al. | |
| 2008/0233306 A1 | 9/2008 | Turgis et al. | |
| 2008/0241389 A1 | 10/2008 | Mullay et al. | |
| 2012/0079952 A1* | 4/2012 | Mondel et al. | 101/170 |

FOREIGN PATENT DOCUMENTS

| | | |
|---|---|---|
| CN | 101284965 A | 10/2008 |
| CN | 101547982 A | 9/2009 |
| CN | 102746730 A | 10/2012 |
| EP | 1297876 A2 | 9/2002 |
| EP | 2392624 A | 12/2011 |
| GB | 2234977 A | 2/1991 |
| JP | 2009-013345 A | 1/2009 |
| WO | WO-01-96121 A1 | 12/2001 |
| WO | WO 2008/048590 | 4/2008 |
| WO | WO-2013-043921 A2 | 3/2013 |

OTHER PUBLICATIONS

International Search Report mailed Nov. 26, 2013 in connection with International Application No. PCT/US2013/045845.
International Preliminary Report on Patentability and Written Opinion for International Application No. PCT/US2013/045845 dated Dec. 16, 2014.
European Search Report from European Application No. 13805102.4, dated Nov. 13, 2015.
Chinese Office Action issued in Chinese counterpart application No. 201380039380.3 dated Oct. 13, 2015.

* cited by examiner

*Primary Examiner* — Betelhem Shewareged
(74) *Attorney, Agent, or Firm* — Charles C. Achkar; Ostrolenk Faber LLP

(57) ABSTRACT

Lithographic printing inks are described, which are characterized by the inclusion of both water, in a substantially emulsified form, and inorganic filler. Inks of the present invention show improved printing properties in offset lithography, including improved transfer, reduced piling and improved mileage. They also offer cost advantages over currently available inks and the ability to minimize or eliminate entirely mineral oil from their compositions. The inks of the present invention may be used in both web-based print processes including coldset and heatset, as well as in sheetfed printing. The inks may be dried to a durable ink film at ambient temperature, with thermal energy or with actinic or electron beam radiation, or with any combination thereof.

22 Claims, No Drawings

LITHOGRAPHIC OFFSET INKS WITH WATER AND FILLER CONTENT

CROSS REFERENCE TO RELATED APPLICATIONS

The present application is a §371 National Phase application based on PCT/US2013/045845 filed Jun. 14, 2013, which claims the benefit of U.S. Provisional Patent Application No. 61/660,159, filed on Jun. 15, 2012, U.S. Provisional Patent Application No. 61/726,172, filed on Nov. 14, 2012, U.S. Provisional Patent Application No. 61/773,204, filed on Mar. 6, 2013, and U.S. Provisional Patent Application No. 61/789,226, filed on Mar. 15, 2013, the subject matter of each of which is incorporated by reference in its entirety.

FIELD OF THE INVENTION

The present invention relates to lithographic printing inks characterized by comprising substantial quantities of both water and inorganic filler. The present invention also relates to means to stabilize the included water as a stable emulsion.

BACKGROUND OF THE INVENTION

It is well known to those skilled in the art that the lithographic printing process depends, in part, for its success in the ability of the ink to form a stable emulsion with an aqueous fount solution prior to the transfer of the ink to a printing plate and, for offset lithography, to a printing blanket. The Printing Ink Manual, 4th Edition (1988), published by Van Nostrand Reinhold (International) Co. Ltd. and The Lithographers Manual, 7th Edition (1983), published by The Graphics Arts Technical Foundation, Inc. both teach the equipment, procedures, and materials typically used in a lithography printing operation.

The general issues concerning achieving a good emulsification between the printing ink and the fount solution is described in W. Beier et al.: "Emulsifying of dampening solution in offset ink in short inking units", 31st International Research Conference of IARIGAI, Copenhagen, Denmark. May 9-Aug. 9, 2004, Proc. page 65, Vol. 31) and Textile Research Journal, September 1981, Vol. 51, no. 9, pages 607-613.

It is well known to those skilled in the art that an emulsion may be made by incorporating water or predominantly aqueous media into a lithographic ink, for example, by high speed stirring together of the two components or by mixing in a Z-blade or similar mixer. However, such emulsions are not always stable. Further, it is also known to those skilled in the art that emulsifying agents used in too high a quantity can lead to overemulsification and thus to inferior print performance of lithographic inks, and can also render tacky the dried ink films after printing.

Improving the emulsifiability of lithographic inks in a conventional offset printing process is taught by U.S. Pat. No. 7,909,924 and by U.S. Pat. No. 7,985,820, both to Krishnan, et al., which disclose stable offset emulsion inks containing non-water soluble polymeric surfactants, useful as components of heatset printing inks.

In order to better provide for a stable emulsified lithographic printing ink system, so-called "single-fluid" or "self-dampening" inks have been developed, which incorporate water into the printing ink and, in conjunction with special waterless printing plates, attempt to obviate the need for a separate fount solution during the printing process. The ink/water emulsion must be stable during storage of the ink, and during the initial stages of printing, yet the water must be released from the ink during the final stages of printing in order that a satisfactory dry ink film be obtained. U.S. Pat. No. 7,240,615 to Lee et al. teaches single fluid lithographic inks containing glycerol for waterless lithography. WO 2004/041946 to Latunski et al. discloses single fluid lithographic printing inks containing a continuous phase and an emulsified phase. The emulsified phase contains water and a polyol. U.S. Pat. No. 6,140,392 to Kingman et al., also discloses single fluid printing inks suitable for waterless offset lithography, wherein the continuous phase includes an acid-functional vinyl resin and the discontinuous (emulsified) phase a polyethylene glycol. US2004/0013983 to Lee et al. teaches the importance of selecting a surfactant of the appropriate hydrophobicity hydrophilicity balance (HLB) for a stable emulsion in single fluid inks.

US2004/115561 to Laksin et al. discloses single fluid energy-curable inks, suitable for waterless lithography. WO2004/045863 to Battersby et al. discloses a planographic printing apparatus and method utilizing a single fluid lithographic ink and special pH-neutral plate cylinder.

It is also well-known to those skilled in the art that successful emulsification of a lithographic ink and a predominantly aqueous medium may require the usage of special emulsifying agents, both to achieve a good level of emulsified aqueous phase, and to maintain the stability of said emulsion. The above-mentioned references disclose polyols and polymeric acids as being useful in this regard. More recently, the incorporation of water into a lithographic ink not specifically designed to be utilized as a "single-fluid" ink has described in U.S. Pat. No. 8,013,034 to Harui et al., which discloses a method of incorporating water in an emulsified form into an offset printing ink, necessitating the use of both an emulsion stabilizer and a water-soluble polymer. Another novel emulsifying chemistry, based on maleated fatty esters and amides, is disclosed by Harui et al. in U.S. Pat. No. 8,013,033. One cited driver for the incorporation of water into a lithographic printing ink is to reduce the volatile organic content (VOC) of that ink. VOC is harmful to air quality and detrimental to the environment of a print shop, most especially to the printers who must operate the printing presses. Historically, some lithographic inks, for example web offset heatset inks, contain between 30 and 45% VOC. Another is to reduce the cost of the raw materials per unit weight of ink.

Inks suitable for lithographic printing also frequently include extenders or fillers as a component. Such materials, which include bentonite, montmorillonite and kaolin clays, calcium carbonate and other inorganic materials, are known to those skilled in the art as a means to reduce the amount of expensive pigments and colorants required in an ink to achieve a particular printing density. They are also of value in optimizing the rheological properties of an ink, to facilitate transfer and printability and minimize piling on the blanket or printing plate, misting and flinging. Traditional extenders and fillers are disclosed in The Printing Ink Manual—Leach, Robert; Pierce, Ray. Fifth Edition (1993), published by Blueprint (pages 191-5) describes typical fillers and extenders for lithographic inks U.S. Pat. No. 4,193,806 to Finlayson discloses organic ink vehicles containing an organophilic clay gellant made from a smectite-type clay and a quaternary ammonium salt. U.S. Pat. No. 4,981,517 and U.S. Pat. No. 5,137,568, both to Durham et al., teach the improved dispersion of extender pigments, in particular kaolin clays, in lithographic offset and letterpress inks, by treating them with quaternary ammonium salts. Ink transfer and related issues in lithographic printing are discussed in The Printing Ink Manual—Leach, Robert; Pierce, Ray. Fifth Edition (1993), published by Blueprint (pages 792-7).

The prior art demonstrates that there is a need for inks suitable for printing by lithography, and, in particular, offset lithography, to be available economically, in order to maximize the value of this print process. There is also a need to minimize the impact of lithographic inks on the environment, by minimizing both their VOC and migratable components that might subsequently produce taint in packaged goods. Recent studies conducted in Switzerland, at the Kantonales Labor Zurich, have found high amounts of mineral oil to have migrated from cardboard used as packaging materials, wherein that cardboard was made from recycle paper and board waste, notably newspaper waste, into foodstuffs. Newspaper waste contains the residues of the coldset inks used to print those newspapers originally, and coldset inks contain a high proportion of mineral oils, to facilitate their drying mechanism of setting into the paper substrate.

The prior art has focused on the inclusion of water or predominantly aqueous media into lithographic inks and, separately, on the inclusion of fillers and extenders into lithographic inks. There is further a need to improve constantly the performance of said inks as printing equipment becomes ever more sophisticated and is able to run with a shorter start-up time, at higher line speeds, and with a wider variety of substrates.

Further, the prior art has described emulsified offset inks under the concept of waterless printing or under the synonym self-dampening ink or single fluid lithographic ink, but only for inks which dry by aerial oxidation (so-called "sheetfed" inks), evaporation of solvent or absorption into the substrate (so-called "coldset" inks) or through the application of heat in the form of hot air or infra-red radiation (so-called "heatset" inks). There is a need to have the same benefits of emulsified lithographic inks with improved transfer available for those inks which cure through actinic radiation or by electron beams (so-called "energy-curing" inks). There is further a need to minimize the raw material cost of such energy-curing inks, given that the oligomers, monomers, and photoinitiators normally present as components of energy-curing lithographic inks are themselves expensive. Therefore there is a need to have available energy-curing inks wherein a stable water/ink emulsion is present without the need for emulsifying agents which can be expensive and render the dried ink films after printing and curing tacky.

SUMMARY OF THE INVENTION

The present invention provides for an ink comprising:
a) 8-15% filler by weight;
b) 10-40% water by weight;
c) one or more resins; and
d) one or more pigments or colorants,
wherein said ink is suitable for printing by lithography.

The present invention also provides for an ink comprising:
a) 1-10% by weight water;
b) 10-30% filler by weight;
c) one or more resins; and
d) one or more pigments or colorants,
wherein said ink is suitable for printing by lithography.

The present invention further provides for an energy-curable ink comprising:
a) 2-20% water by weight;
b) 3-10% filler by weight;
c) one or more pigments or colorants; and
d) one or more photocrosslinkable compounds
wherein said ink is suitable for printing by lithography.

The present invention also provides for a process for manufacturing the inks of this invention, comprising the step of:
a) combining at least one filler, resin and colorant to form a premilled ink, and;
b) adding water to said premilled ink, with stirring under sufficient shear that the water is emulsified, and maintaining the temperature of the operation below about 60° C.

The present invention further provides for a process for manufacturing the energy-curable inks of this invention, comprising the steps of:
a. combining at least one filler, photocrosslinkable compound and colorant to form a premilled ink, and;
b. adding water to said premilled ink, with stirring under sufficient shear that the water is emulsified, and maintaining the temperature of the operation below about 60° C.

The present invention also provides for a process of offset lithographic printing, comprising the steps of printing any the inks of this invention onto a substrate, then curing said ink with one or more of the means selected from a group comprising: actinic radiation, electron beam, heat, infra-red, and air-drying, to form a dry ink film on said substrate.

The present invention further provides for a printed article produced by the method of printing any of the inks of this invention onto a substrate.

DETAILED DESCRIPTION OF THE INVENTION

It is an object of our invention to demonstrate lithographic printing inks which are more economical in raw material cost than those hitherto known, and with minimized impact on the environment, and which yet perform in an equivalent or superior fashion to those inks known to those skilled in the art during the printing process. The prior art has focused on the inclusion of water or predominantly aqueous media into lithographic inks and, separately, on the inclusion of fillers and extenders into lithographic inks.

It is another object of the present invention to further provide for the curing of said inks to a durable dry film by oxidative drying, ambient drying, drying through the application of thermal or infra-red energy, and drying by means of actinic or electron beam radiation, or by any combination of the above-mentioned curing processes.

In one embodiment, a novel lithographic printing ink is disclosed comprising 10-40% by weight of water and 8-15% by weight of inorganic filler and further comprise at least one resin and at least one pigment or colorant suitable for the making of a lithographic ink. Preferably, the inks of our invention comprise 20-40% by weight of water and 10-15% by weight of filler or extender. Most preferably, the inks of our invention comprise 30-40% water by weight and 10-15% of filler or extender by weight. By this means, the advantages in storage stability, print performance, environmental suitability, and cost-competitiveness of including substantial amounts of water or predominantly aqueous media into a lithographic ink with those that obtain by including substantial amounts of filler or extender, have been combined. It is found, also that a filler load higher than 10% by weight helps to stabilize the water emulsion. It is found, further, that, especially in inks in which water is pre-emulsified, the water can be characterized as "bond water". This means the aqueous phase acts as if it were a solid component and becomes a part of the structural binder system of the ink. Thus high levels of both water and filler or extender act co-dependently to optimize the rheology and print performance of the lithographic inks of our invention.

In another embodiment, a novel lithographic printing ink is disclosed comprising 10-30% by weight of inorganic filler and 1-10% by weight of water and further comprising at least one resin and at least one pigment or colorant suitable for the making of a lithographic ink. Preferably, the inks of our invention comprise 4-10% of water by weight and 20-30% of filler or extender by weight. Most preferably, the inks of our invention comprise 4-10% of water by weight and 25-30% of filler or extender by weight. By this means, the amount of filler that may be incorporated into a lithographic ink, has been increased, while maintaining or augmenting print properties of the ink.

In a further embodiment, a novel energy-curable lithographic printing inks comprising 2-20% by weight of water and 3-10% by weight of inorganic filler, together with one or more pigments or colorants and one or more photocrosslinkable materials. Preferably, the energy-curing inks of our invention comprise 6-20% by weight of water and 3-10% by weight of extender or filler. Most preferably, the energy-curing inks of our invention comprise 9-20% of water by weight and 3-10% of filler or extender by weight. In this way, the benefits of print performance, cost-effectiveness and ink storage stability hitherto only obtainable separately, have been combined.

In a yet another embodiment, a method of manufacture of the novel lithographic inks of this invention is disclosed, comprising the step of incorporating water or substantially aqueous media into an lithographic ink which has been premilled and contains all necessary components to perform as a high quality printing ink save that of the water component. Said method can include the incorporation of an emulsifying agent into the ink/water emulsion, to provide an appropriate level of ease of formation of the ink/water emulsion, maintain its stability in storage and yield optimal print and dry film performance when the ink is printed. This invention is not limited to the use of a particular emulsifying agent, and, advantageously, a combination of two or more different emulsifying agents may be employed. The pre-emulsification of water allows for a more even distribution of the water within the ink. This way, the ink/water equilibrium on press is achieved more rapidly and more thoroughly which results in better transfer and less misting, due, in part, to the cooling effect the evaporating water gives to the printed surface and which contributes also to a cleaner and healthier press room environment.

Said emulsifying agents may include non-water soluble materials. Stable water in oil micro-emulsions of offset lithographic inks have been described in the prior art, above. These offer many advantages over non-emulsified inks, including but not limited to lower VOC, better misting, and lower water demand. However, under high shear press conditions micro-emulsions made with conventional surface active agents are often not sufficiently stable. This leads to press problems such as loss of color density due to poor transfer, and in extreme cases, complete loss of image due to stripping. It has now been discovered that, employing the emulsification process of the present invention, inks that are stable under high pressure during the print process can be produced.

Preferably, incorporation of said emulsifying agents is performed under controlled pH conditions. Most preferably, the pH ranges for optimal quality are tied to the emulsifying agent type and are pH 8.0-9.5 and 4.0-5.5.

In yet a further embodiment, the process of printing the inks of our invention onto a substrate, and the printed article that derives therefrom, are disclosed. Through the inclusion of both water and filler or extender in the inks of our invention, there is a reduced requirement for the typical hydrocarbon solvents and mineral oils that are typically included in commercial lithographic inks. Thus the inks of our invention bring environmental benefits both in terms of a healthier pressroom environment, through a reduction in VOC content, and in the performance of the printed article made using the inks of our invention, in terms of reduced migration of oils into foodstuffs, when the printed article is an article of packaging. A further practical advantage when employing the inks of our invention is reduced waste substrate, for example newsprint paper, due to shorter press start-up times.

Lithographic printing inks, especially those designed for offset printing, were prepared to include simultaneously high amounts of water and high amounts of an inorganic particulate material, termed a "filler" or "extender". Preferably, the extender is selected from calcium carbonate, clay (including bentonite, montmorillonite and kaolin clay), talc, magnesium carbonate and silica, or combinations thereof. Most preferably said filler is a calcium carbonate or a kaolin clay and is in a particulate form wherein the mean particle size of the particles is 1.4 microns or less. Optionally a dispersant can be used to disperse the clay or other filler employed. A preferred class of materials, suitable for air- or heat-drying lithographic inks, is modified soy oil dispersants.

It will be appreciated by those skilled in the art that the appropriate selection of a filler or extender depends on the particle size and particle size distribution of said filler or extender, together with its oil absorption potential, as well as the nature of the other raw materials comprising the printing ink. The latter are selected according to whether the ink is designed for coldset, heatset or sheetfed offset printing, as is well-known to those skilled in the art. The use of filler at a very high loading has to be carefully formulated for intrinsic ink properties. Lithographic printing inks require a carefully controlled and high level of tack. Tack is a lithographic ink property that needs to be tailored for the substrate that is being printed on. For example, a lower tack is needed to print on uncoated newsprint stock versus, for example, a coated paper, in order to avoid picking ("picking" is the removal of an already-printed ink by another ink during a multicolor print process) and substrate web breaks. Ink viscosity preferably should be at the highest viscosity per unit tack. Tack is conveniently measured using an electronic inkometer with a water bath maintained at 90±0.5° F.

In addition, ink strength, leading to the printed colorimetric optical density of the dried ink film, needs to be appropriate for the paper. For example, if the strength is too high, the ink film may be too thin, creating in turn conditions where ink picking may become a problem. Fillers and extenders are also well-known to those skilled in the art to be valuable components of a lithographic ink to optimize ink misting and flinging, and water uptake during interaction with fount solution.

It will also be appreciated that the abovementioned characteristics of a filler or extender are material in the stabilization of the water content of a lithographic printing ink which contains water in a predominantly emulsified form, as is the case with the inks of this invention. It is also a feature of this invention that the amount of water which may be incorporated into a printing ink and the stability of the emulsified water within that ink may also be enhanced by the use of suitable emulsification aiding additives. It is a critical feature of the inks of this invention that the stability of the water-in-oil emulsion remain high throughout manufacture, storage and shipping, and during the printing process. In particular this requires that there be no phase separation of the emulsion under influence of high shear and high pressure. The high shearing of lithographic printing inks is a feature of the environment that they must experience, both during manufacture, and when the ink is transferred from ink ducts to the printing plate down a roller train. The target of this novel ink system is to exhibit acceptable performance compared to, or, preferably, improved over, conventional lithographic inks under both laboratory and commercial pressroom conditions. Using the platform of the present invention, it has been found that water can be emulsified into lithographic inks up to a level of 40% by weight, in the concomitant presence of suitable fillers, which may be present in a range up to 30% by weight. Such inks are stable up to an applied pressure of until 40 bars.

It is a feature of the present invention that the colorimetric optical density of the ink and mileage of the ink when printed remain, at minimum, equivalent to lithographic inks not benefitting from both water and filler addition. The properties of colorimetric optical density and ink mileage are not dependent to percentage of water addition but only upon the stability of the water-in-oil emulsion. Improved mileage (reduced ink consumption). Ink mileage is defined as the amount of ink needed to cover a specific area of substrate at a specific optical density. Improved mileage results in a reduction in ink consumption during the press run, which is an economic benefit to the printer. Mileage may be measured and calculated, for example, from the density curves based on laboratory prints, for heatset and sheetfed inks, on APCO paper with a Prüfbau Printability Tester. It may also be conveniently be assessed, for coldset inks, by printing onto 27.7# Abibow Newsprint. In the latter case, the substrate is dried using the Sinvatrol heatset dryer. Density may be recorded using an X-Rite spectrodensitometer. The amount of ink required to achieve an equal density, as determined by weighing on an analytical balance, determines relative the mileage. A lower weight at an equal density would equate to improved mileage.

When subjected to high shear conditions on press, the inks of this invention maintain their cohesion and transferability Unstable emulsified lead to press problems such as stripping and loss of color control. A further benefit of being able to maintain, at minimum, optical density and mileage with inclusion of substantial amounts of water and filler is that the organic content of the printing inks is reduced. This is a benefit, as described above, both for VOC reduction and for limiting the presence of materials like mineral oils that can subsequently cause issues with taint in foodstuffs.

It is a further feature of this invention that the incorporation of water into the printing inks of this invention can be optimized by the appropriate selection of different emulsification agents, each having an optimal pH of incorporation. It is thus a feature of this invention that, to optimize the amount of water being incorporated into the printing ink, to maximize all stated benefits hereinbefore delineated, the individual aqueous emulsifying agent solutions must be admixed into the ink matrix serially in order to avoid poor emulsion stability caused by simultaneously adding emulsification agents of differing optimal pH value all at once. A particularly effective addition scheme that it has been found is: firstly, to employ an emulsifying agent best suited to mild alkaline solution (optimum pH range 8.0 through 9.5), then, secondly, to employ an emulsifying agent best suited to mild acidic conditions (pH 4.0 through 5.5), then if necessary, a third and final deployment of an emulsifying agent best suited to mild alkaline solution (optimum pH range 8.0 through 9.5). The scheme is important to avoid gums such as gum Arabic to separate, when these natural gums is used as one of the emulsification agents. This platform approach can be applied to all types of offset inks and will provide pressure stable emulsions with no loss of colorimetric optical density or ink mileage. Suitable emulsifying agent include, but are not limited to, a salt of tall oil fatty acid, dimer acid, a polyalkylene oxide surfactant, ambergum, gum Arabic, a maleated fatty ester, a maleated fatty amide and a dioleate, preferably a poly(alkyene oxide) dioleate or a modified sugar dioleate.

A further benefit deriving from the printing inks of this invention is found in reduced piling on the blanket during the lithographic offset printing process. "Piling" is defined as the build-up of pigment particles and paper fibers upon the blanket or printing plate, caused by the inability of the ink to transfer through the press. It has been found that the inks of the present invention are improved in their tendency to pile. This is seen by the reduction in the number of blanket washes necessary when employing the inks of the present invention on a printing press. It has been found that the time between blanket washes was on average, doubled, in comparison to employing conventional printing inks. Piling may also be assessed on a visual basis and rated as 1-10, with 1-3 being minimal or slight piling; 4-6 being moderate piling; and 7-10 being severe piling.

Suitable resins for lithographic ink design include, but are not limited to, hydrocarbon resins, hybrid resins (hydrocarbon/rosin blend), aldehyde resins, maleic modified rosin ester, alkyds, phenolic modified rosin ester, and others well-known to those skilled in the art, for conventional lithography.

Suitable oils and solvents may include, but are not limited to mono-, di-, or tri-glycerides liquid at 25° C., heavy oils, hydrocarbon distillates, and mineral oils.

Suitable waxes for the inks of this invention include, but are not limited to amide wax, erucamide wax, polypropylene wax, paraffin wax, polyethylene wax, polytetrafluoroethylene, carnauba wax, and combinations thereof.

Suitable additives, for the purposes of optimizing ink performance for particular applications, including the modification of flow, surface tension, rheology, gloss, plasticity, pH, pigment and extender wetting and abrasion resistance of the dried and cured printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Additional to waxes, as disclosed hereinbefore, preferred additives include surfactants, including fluorocarbon, silicone and organic monomeric and polymer types. Said additives may further include emulsifying agents, including those hereinbefore mentioned.

For energy-curing lithographic inks, acrylic monomers used in the inks of the present invention are preferably esters of acrylic acid with a defined structure, a functionality of greater or equal to 2, having a weight number average of 200-800 Daltons, which impart curing speed, solvent resistance, hardness and allow viscosity adjustment. A non-limiting list of examples of acrylate monomers and oligomers suitable in inks of this invention include 1,2-ethylene glycol diacrylate, 1,4-butanediol diacrylate, 1,6-hexanediol diacrylate, dipropylene glycol diacrylate, neopentyl glycol diacrylate, ethoxylated neopentyl glycol diacrylates, propoxylated neopentyl glycol diacrylates, tripropylene glycol diacrylate, bisphenol-A diacrylate, ethoxylated bisphenol-A-diacrylates, bisphenol-A-diglycidyl ether diacrylate, ethoxylated bisphenol-A-diacrylates, poly(ethylene)glycol diacrylates, trimethylol propane triacrylate, trimethylol propane trimethacrylate, ethoxylated trimethylol propane triacrylates, propoxylated trimethylol propane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, di(trimethylol propane)tetraacrylate, di(pentaerythritol)pentaacrylate, di(pentaerythritol)hexaacrylate ethoxylated di(pentaerythritol)hexaacrylates or mixtures thereof, preferred are ethoxylated trimethylol propane triacrylates, ethoxylated pentaerythritol triacrylates and propoxylated pentaerythritol tetraacrylates.

An acrylic oligomer used in the inks of this invention is preferably a prepolymer with a weight number average of 400-3000 Daltons, an acrylate functionality greater or equal to 2, such as for example epoxy acrylates, polyester acrylates, acrylated polyurethanes, acrylated polyacrylates, acrylated polyethers, acrylated epoxidized oils based on linseed oil and soybean and castor oil and mixtures thereof. It imparts rheology, pigment wetting, transfer, gloss, chemical resistance and other film properties.

The radiation curable inks of the present invention may contain, inert, non-curable resins having no curable acrylic groups, such as polyacrylates, polyesters, polyurethanes, polyamides, ketone resins, aldehyde resins, alkyd resins, phenol-formaldehyde resins, rosin resins, hydrocarbon resins, alkyd resins or mixtures of the aforementioned. Preferably, such inert resins will have a number average molecular weight of between 1,000 and 30,000 Daltons, and most preferably number average molecular weight of between 1,000 and 4,000 Daltons. Such resins may reduce shrinkage, improve adhesion, pigment wetting, gloss, rheology, flexibility, and usually, solid, "hard" resins are dissolved in acrylic monomers, such as trimethylol propane triacrylate and added to the premix of raw materials prior to milling as a varnish. The energy curable inks of the present invention may contain one or more colorants in the form of a dye or pigment dispersed therein.

The energy-curable inks of the present invention may contain, if cured by UV-light, photo initiators, such as for example benzophenones, benzilketals, dialkoxy acetophenones, hydroxyalkyl acetophenones, aminoalkylphenones, acyl phosphine oxides and thioxanthones, for example benzophenone, methyl benzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxy acetophenone, diethoxy acetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenyl acylphenyl phosphine oxide, diphenyl(2,4,6-trimethylbenzoyl)phosphine oxide, 2,4,6-trimethylbenzoylethoxyphenyl phosphine oxide, 2-isopropylthioxantone, 4-isopropylthioxanthone, 2,4-dimethylthioxanthone or mixtures thereof.

It will be appreciated to those skilled in the art that lithographic printing inks which are of the so-called "hybrid" type, that is, may be cured by a plurality of means including but not limited to aerial oxidation, ambient temperature drying, absorption into a substrate, heat, infra-red radiation, actinic radiation, and electron beams, may contain raw materials suitable both for conventional-curing lithographic inks and for energy-curable lithographic inks.

Colorants suitable for use in the inks of the present invention include conventional dyes and organic or inorganic pigments. Dyes include but are not limited to azo dyes, anthraquinone dyes, xanthene dyes, azine dyes, and combinations thereof. Representative pigments may, for example, be selected from the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, Pigment White 6, Pigment White 7, iron oxide, chromium oxide, ferric ammonium ferrocyanide, ferric oxide black, and Pigment Black 7.

Among inks of this invention designed to be energy-curable, a preferred group are those of viscosity of 5-100 Pascal Seconds (PaS) at a shear rate of D=50 1/s, and comprising the following components:
  (a) About 5-30% of an acrylic monomer, including those hereinbefore mentioned;
  (b) About 5-30% of an acrylic oligomer, including those hereinbefore mentioned;
  (c) About 0-25% of an inert resin, including those hereinbefore mentioned;
  (d) About 5-25% of a colorant or pigment, including those hereinbefore mentioned;
  (e) About 0-20% of a photoinitiator, including those hereinbefore mentioned;
  (f) About 2-20% of water;
  (g) About 3-10% of fillers, including those hereinbefore mentioned; and
  (h) About 0-4% of additives, for the purposes of optimizing ink performance for particular applications, including modifying flow, surface tension, gloss, flow, pigment wetting and abrasion resistance of the cured coating or printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Preferred additives include fluorocarbon surfactants, silicones and organic polymer surfactants. As examples, the Tegorad product lines (Tegorad are trademarks and are commercially available products of Tego Chemie, Essen, Germany) and the Solsperse product lines (Solsperse are trademarks and are commercially available products of Lubrizol Company). Said additives may further include waxes, including those hereinbefore mentioned; emulsifying agents, including those hereinbefore mentioned; flow and further wetting aids, including but not limited to monomeric surfactants, and pigment and filler dispersing aids, including but not limited to modified soy oil.

A particularly preferred group of inks are those characterized in that the ink shows a peak maximum of below −40° C. for emulsified water, measured by differential scanning calorimetry (DSC) at a cooling rate of 10° C./minute.

It is observed that even with a small amount of emulsified water (greater than 1 weight %) in an energy curable lithographic ink of the present invention, the amount of ink which is transferred to the blanket is enhanced under identical settings for ink, dampening, temperature and roller speed. This technical advantage was observed with a variety of inks containing different ink vehicles and acrylated diluents and is widely independent from the viscosity of ink.

It is furthermore observed that lesser amounts of water, less than 10 weight percent, and preferably less than 5 weight percent can be finely and stably emulsified into energy curable inks of the present invention without the need for an emulsifier, hydrophilic inorganic extender or water-soluble resins. Unlike in oil-based heat-set lithographic emulsified inks, which have been reported in the prior art and which often require an emulsifier, a monomeric or polymeric ionic or non-ionic surfactant or a water-soluble monomer or resin to keep the water in an emulsified stable state (WO 2008045578, WO2004045863 and US2004013983), the inks of the present invention do not necessarily need hydrophilic or surface active materials, though they may be optionally used at 0-20%, preferably 3-15% to improve certain press properties (e.g. misting).

It is furthermore disadvantageous to adopt the concept of emulsification of conventional emulsified inks, proposed for such concepts as waterless printing, self-dampening ink or single fluid lithographic ink (e.g. WO2004045863), directly to energy curable inks. For the above mentioned emulsified conventional inks, a lot of hydrophilic, water-soluble materials are introduced such as alcohols, glycerol, glycol ethers, polyethylene glycol oligomers, acid functional acrylic resin and surfactants and emulsifiers and the like. These non-curable, liquid materials retard cure and can leave behind a smeary and tacky surface after drying if incorporated into an energy curable system. Moreover, the use of emulsifiers in a typical energy curable lithographic ink should be used with care due to the influence on the water-ink balance and risk of over-emulsification.

The inks of the present invention are made using typical procedures known in the art, usually by dry-grinding or using a flush. In a typical manufacturing procedure for inks, the required amount of dry pigment is mixed with resins and/or oils and/or acrylate monomers and/or oligomers and additives on a mixer for 15-30 minutes to wet out all pigment. The pre-mix is then ground on a three roll mill until the desired grind specifications are met.

The water for emulsification can be added to the pre-mix of raw materials before milling or preferably post-added to the finished ink at a post-blend station. When water is stirred in after milling, rather than added before milling, the amount of emulsified water in the ink is more consistent, as the stirring condition can be better controlled. If water is introduced prior to milling, a portion of the water may be lost due to evaporation during the milling process. In the case of mill portions that require multiple mill passes, a large portion of the water may be lost. Usually, the emulsification of the ink with water is carried out with a stirrer introducing a good shear force into the ink. This can be a propeller stirrer, a dented dissolver plate, a centrifugal mixer or a tri-foiled butterfly mixer, among others. Preferred is a tri-foiled butterfly mixer for dispersion of highly viscous mixtures. Typically, during the emulsification process the inks may increase in temperature. The temperature preferably would not exceed 60° C. during the emulsification; otherwise a portion of the emulsified water can be lost by evaporation.

During the emulsification step, other additives and, in the case of energy-curable ink manufacture, monomers can be added to adjust rheology, tack and flow.

In order to achieve a good transfer during the printing process with the inks of the present invention, it is preferred that the water in the ink is sufficiently finely emulsified. Assessment of the quality of emulsification will be described in the following paragraphs.

The quality of an ink of the present invention to perform well as a printing ink for the particular printing method and application that a printer might require may be judged by one or more of the methods delineated in the following paragraphs.

Typically, the emulsified inks of the present invention show a viscosity of 5-100 Pascal Seconds (PaS) at a shear rate of D=50 1/s, as measured with a commercial cone & plate rheometer, including that supplied by Physika RCS 300 from Anton Paar Company in Germany, which is a typical stress rheometer and widely used in quality control as well as in research and development. The inks are sheared with an increasing shear rate of D=2 to 100 1/s and the value for viscosity at a shear rate of 50 1/s. Preferred is a viscosity of 20-50 PaS. Another useful procedure for the measurement of viscosity involves measurement at 25° C. with cone and plate viscometer (HAAKE PK 100 rotational viscometer, 0.5° angle, speed set to 5).

The emulsified inks of the present invention preferably show a flow of 1-15 cm on an inclined plate. An incline plate is a vertically (90°) fixed aluminum plate on which 1 ml of ink is applied on top. Then, the distance is measured in which the ink runs down the plate within 15 minutes by gravity. Preferred is a flow of 4-8 cm.

The emulsified inks of the present invention preferably show a tack of 200-400 units measured using a "Tack-o-Scope" instrument (Model 2001) from IGT Testing Systems, a company operating in the Netherlands, which is known to a person skilled in the art. As emulsified water may evaporate from the tack-o-scope, a special method is applied. First, 1 ml of ink is distributed on the rubber roller and held at 30° C. for 90 seconds at a roller speed of 50 rpm, then 30 seconds at 300 rpm. Then, the tack value is taken at a roller speed of 150 rpm. The preferred tack is 250-350 units.

In order to assess the quality of water emulsification, differential scanning calorimetry (DSC) is used. DSC is a thermo-analytical technique in which the difference in the amount of heat required to increase the temperature of a sample and reference is measured as a function of temperature. Both the sample and reference are maintained at nearly the same temperature throughout the experiment. The result of a DSC experiment is a curve of heat flux versus temperature or versus time. The basic principle underlying this technique is that when the sample undergoes a physical transformation such as phase transitions, more or less heat will need to flow to it than the reference to maintain both at the same temperature. For example, as a solid sample melts to a liquid it will require more heat flowing to the sample to increase its temperature at the same rate as the reference. This is due to the absorption of heat by the sample as it undergoes the endothermic phase transition from solid to liquid. Likewise, as the sample undergoes exothermic processes (such as crystallization) less heat is required to raise the sample temperature. By observing the difference in heat flow between the sample and reference, differential scanning calorimeters are able to measure the amount of heat absorbed or released during such transitions.

As water is cooled, it starts to freeze and due to the exothermic nature of this process, heat flow peaks can be observed in DSC, depending whether it is free, "bulk" water or so-called "bound" or "bonded" emulsified water. According to the prior art, free water and interfacial free water in an ink gives a sharp peak maximum around 0° C. to −20° C. in DSC, whereas finely emulsified water shows a broad peak with a peak maximum at −30 to −55° C. The target of the emulsification process is to provide inks having only peaks with maxima below −40° C. in DSC. The integrated area under the peak (Joule/g) in the DSC is an indication of the amount of emulsified water in the ink. If more water is finely emulsified, the number for the integrated area is larger. Ideally, no free water is detected in the energy curable ink, which has been demonstrated with this technique in our laboratories. The energy curable ink with 6% of emulsified water typically shows about three times the heat flow than the ink with 3% of water. No free water is detected (absence of peaks below −40° C.). The energy curable ink without emulsified water typically shows no signals. A particularly preferred group of inks are those characterized in that the ink shows a peak maximum of below −40° C. for emulsified water, measured by differential scanning calorimetry (DSC) at a cooling rate of 10° C./minute.

If, on the other hand, the water is not properly emulsified, the peak maximum in DSC shifts to higher temperatures and the shape of the peak becomes broader and often bimodal. This results in the ink becoming less stable and under high shear force or storage water, may separate from the ink as a separate phase and as a result the technical advantage of the energy curable inks of this invention is diminished or lost.

A further test for emulsion stability is as follows. 50 grams of ink is put into the feed rolls of a 4×8 inch laboratory 3-Roll mill. The material is passed through at slightly less than a typical grinding pressure known to those skilled in the art for ink manufacture—for example, about 435 pounds per square inch (psi). While the material is being milled, an ink with poor stability will gradually release water as small bubbles that will increase in size and ultimately lead to only water in the feed rollers. Visual inspection is used to grade the quality of water emulsification.

Emulsion stability of the inks of this invention was also evaluated at a pilot scale on a press simulator unit supplied by Mitsubishi Heavy Industries Ltd. The objective was to correlate the results with those obtained by DSC, that the emulsified water is very finely dispersed, so that there will be no phase separation under stress during the transport, the delivery procedure (pumps) and on press. The general litho suitability of the inventive inks can thus also be verified by this press simulator unit. This device can be considered as a single press unit that is run without paper by transferring the ink from the blanket cylinder to a metal cylinder where it is scraped off with a doctor blade. Apart from the missing paper, the ink is run under real print conditions and the same tests or observations like on a real press, for example water window, misting, etc., can be performed.

The tests of the inventive inks on the Mitsubishi press simulator run at high speed of 15 meters/sec, using a separated Dahlgren dampening configuration showed a similar performance to commercial inks containing high levels of mineral oil, and without the benefit of containing quantizes of both water and filler.

To underscore the efficacy of the Mitsubishi print simulator as a predictor of press performance of the inks of this invention, conventional inks of this invention were run over a period of three months on a commercial offset lithographic press and continuously compared to a commercial ink set run for the same period on the same press. The ink set of the present invention performed equivalently to the commercial set known from its performance in the field to be valuable for commercial lithographic print runs.

Further, the water window of the inks of this invention was comparable to the standard commercial inks. The scumming point (minimal amount of water required to clear the non-image areas) was at 70% compared to 65% for Standard under testing conditions. No water separation was observed in the ink trough or on the rollers. Full details are described below in the Examples.

Freezing-point depression can be used as a means to get a qualitative understanding of droplet size distribution of the emulsified water droplets. This is possible because the temperature range over which a water-in-oil emulsion "melts" is dependent on the droplet size distribution. Smaller water droplets will exhibit a stronger depression of the freezing point while coarse droplets show only little freezing point depression. A comparison by DSC of a Sun Chemical Standard Yellow ink (sold as BCY 3250) containing 4% of water compared to a Yellow inventive ink containing 20% of water is instructive. Both DSC measurements yield a single peak at −40° C. This indicates that there is no free water left in either system, which would show a peak shoulder at −30° C. or higher when the sample is cooled down. It has also been shown for another standard ink to which 10% of water was added with only gentle stirring, that a very broad DSC curve with a clear shoulder at −30° C. is obtained. This clearly indicates the presence of large water droplets in the evaluated emulsion sample which are likely to separate again over time. These tests demonstrate that when measured under laboratory conditions, the high amount of water in the inks of our invention is finely dispersed. As finely dispersed water is much tighter bound into the ink system, this is an indication, borne out in practice by observing the ink over a lengthy time period, that there will be no water separation during handling and processing of the ink.

Particularly preferred inks of the present invention are those which, when measured by the tests delineated above, show that the ink characterized in that the water in the ink is predominantly emulsified water with a ratio of emulsified water to free water of greater than 9:1, measured by the ratio of integrated areas of heat flow in differential scanning calorimetry at 0 to −20° C. and −30 to −60° C., measured with a cooling rate of 10° C./minute. Most preferably, the inks of the present invention are characterized in that the emulsified water is present at greater than 90% of the total water content of the ink, and that droplets of emulsified water have a size of less than 13 μm.

Such inks are further characterized in that the inks exhibits an improved transfer of between 5-100% compared to the same formulation without emulsified water, measured by the collected ink on a Mitsubishi offset print simulator.

The ink characterized in that the water in the ink is predominantly emulsified water with a ratio of emulsified water to free water of greater than 9:1, measured by the ratio of integrated areas of heat flow in differential scanning calorimetry at 0 to −20° C. and −30 to −60° C., measured with a cooling rate of 10° C./minute. The ink of claim 27, characterized in that the emulsified water having greater than 90% of water droplets having a size of less than 13 μm.

The ink characterized in that the ink exhibits an improved transfer of 5-100% compared to the same formulation without emulsified water, measured by the collected ink on an offset print simulator, as supplied by Mitsubishi.

The inks of this invention may be printed on a wide range of substrates, including but not limited to those composed of any typical substrate material such as paper, plastics, metals, and composites. The substrate may be paper print stock typically used for publications or may be a packaging material in the form of a cardboard sheet or corrugated board, aluminum foil, a container such as a bottle or can, or the like. In some instances, the packaging material is a polyolefin, such as a polyethylene (PE) or a polypropylene (PP), a polyester such as polyethylene terephthalate (PET), or a metalized foil such as an laminated aluminum foil, a metalized polyester, or a metal container.

Preferably, the inks of this invention that are designed to be energy-curable are further characterized in that the inks have less than 6% of emulsified water and do not contain water-soluble inorganic salts or emulsifiers with a hydrophilicity lipophilicity balance (HLB) value of 2-18 and do not contain water-soluble monomers or water-soluble resins.

The radiation curable inks of the present invention can be UV-cured by an actinic light source, such as for example UV-light, provided by a high-voltage mercury bulb, a medium-voltage mercury bulb, a xenon bulb, a carbon arc lamp, a metal halide bulb, a UV-LED lamp or sunlight. The wavelength of the applied irradiation is preferably within a range of about 200 to 500 nm, more preferably about 250 to 350 nm. UV energy is preferably within a range of about 30 to 3000 mJ/cm$^2$, and more preferably within a range of about 50 to 500 mJ/cm$^2$. In addition, the bulb can be appropriately selected according to the absorption spectrum of the radiation curable composition. Moreover, the inks of the present invention can be cured under inert conditions.

Alternatively, the radiation curable inks of this invention can be cured by electron beam (EB). Commercially EB-dryers are available for example from Energy Science, Inc. of Wilmington, Mass., or from Advanced Electron Beams Inc. (AEB) of Wilmington, Mass. The energy absorbed, also known as the dose, is measured in units of kiloGrays (kGy), one kGy being equal to 1,000 Joules per kilogram. Typically, the electron beam dose should be within the range of 10 kGy to about 40 kGy for complete curing. With the radiation curable composition of this invention a radiation dose of 20-30 kGy at an oxygen level of below 200 parts per million (ppm) is usually sufficient to get a dry, solvent resistant ink or coating.

Gloss is a key parameter for the dried films of all classes of inks of this invention, and is conveniently measured with a Sheen glossmeter at 60° angle.

The following examples illustrate specific aspects of the present invention and are not intended to limit the scope thereof in any respect and should not be so construed.

Example 1

Preparation of emulsification intermediates for the incorporation of water into lithographic inks. Three emulsification solutions were prepared as aids to permit the incorporation of up to 40% of water into a conventionally-curing offset lithographic ink.

The order of addition is of these solutions to a premilled ink is:

1. Emulsifier solution 1, 2, 3 or 4 (pH 8.0-9.5)
2. Emulsifier solution 6 or 7 made from an intermediate 5 (pH 4.0-5.5)
3. Emulsifier solution 8 (pH 8.0-9.5)

TABLE 1

| Emulsifier Solution 1 | |
|---|---|
| Material | % |
| Potassium salt of tall oil fatty acid | 1.0 |
| Water | 99.0 |
| Total | 100.0 | pH: 9-10

Process: Mixed Under High Speed Mixer 15 Minutes

TABLE 2

| Emulsifier Solution 2 | |
|---|---|
| Material | % |
| Potassium salt of tall oil fatty acid | 10.0 |
| Water | 90.0 |
| Total | 100.0 | pH: 9-10

Process: Mixed Under High Speed Mixer 15 Minutes

TABLE 3

| Emulsifier Solution 3 | |
| --- | --- |
| Material | % |
| Sodium salt of tall oil fatty acid | 1.0 |
| Water | 99.0 |
| Total | 100.0 | pH: 9.5-10.5

Process: Mixed Under High Speed Mixer 15 Minutes

TABLE 4

| Emulsifier Solution 4 | |
| --- | --- |
| Material | % |
| Sodium salt of tall oil fatty acid | 10.0 |
| Water | 90.0 |
| Total | 100.0 | pH: 9.5-10.5

Process: Mixed Under High Speed Mixer for 15 Minutes

TABLE 5

| Emulsifier Solution 5 | |
| --- | --- |
| Material | % |
| Ethylene oxide/Propylene oxide surfactant of HLB value 8-18 | 10.0 |
| Water | 90.0 |
| Total | 100.0 | pH: 6.5-7.5

Process: Mixed Under High Speed Mixer for 15 Minutes

TABLE 6

| Emulsifier Solution 6 | |
| --- | --- |
| Material | % |
| Emulsifier Solution 5 | 10 |
| Ambergum 1221 | 10 |
| Water | 80 |
| Total | 100.0 | pH: 4-5

Process: Mixed Under High Speed Mixer for 15 Minute

TABLE 7

| Emulsifier Solution 7 | |
| --- | --- |
| Material | % |
| Emulsifier Solution 5 | 10 |
| Gum Arabic | 10 |
| Water | 80 |
| Total | 100.0 | pH: 4-5

Process: Mixed in Kettle at 80° C. 5 Hr

TABLE 8

| Emulsifier Solution 8 | |
| --- | --- |
| Material | % |
| Dioleates | 25 |
| Isopropyl alcohol | 25 |
| Water | 50 |
| Total | 100.0 | pH: 8-9

Process: Mixed Under High Speed Mixer for 30 Minutes

Example 2

Cyan offset ink preparation and evaluation. Inks were prepared as in Table 9.

TABLE 9 formulations of cyan inks

| Material | Comparative Cyan Ink | Cyan Ink A | Cyan Ink B | Cyan Ink C | Cyan Ink D |
| --- | --- | --- | --- | --- | --- |
| Rosin modified phenolic resin[1] | 20 | 18 | 16 | 14 | 12.0 |
| Oil distillate 280-310[2] | 10 | 9 | 8 | 7 | 6 |
| Soya methyl ester[3] | 7 | 6.3 | 5.6 | 4.9 | 4.2 |
| Alkyd[4] | 5 | 4.5 | 4.0 | 3.5 | 3 |
| C9 hydrocarbon resin[5] | 10 | 9 | 8 | 7 | 6 |
| Naphthenic oil[6] | 15 | 13.5 | 12 | 10.5 | 9 |
| Cyan pigment[7] | 15 | 13.5 | 12 | 10.5 | 9 |
| Filler 1[8] | 14 | 12.6 | 11.2 | 9.8 | 8.4 |
| Filler 2[9] | 3 | 2.7 | 2.4 | 2.1 | 1.8 |
| Wax[10] | 1.0 | 0.9 | 0.8 | 0.7 | 0.6 |
| Emulsifier solution 1 | | 4.5 | | | |
| Emulsifier solution 2 | | | 9.0 | | |
| Emulsifier solution 3 | | | | 13.5 | |
| Emulsifier solution 4 | | | | | 18 |
| Emulsifier solution 6 | | 4.5 | 9.0 | | 18 |
| Emulsifier solution 7 | | | | 13.5 | |
| Emulsifier solution 8 | | 1 | 2 | 3 | 4 |
| Total | 100 | 100 | 100 | 100 | 100 |
| Total water % | 0 | 9 | 18 | 28 | 37 |

The inks in Table 9 were prepared by the general procedure as shown:
1. Resin cooked by using oils (stirred at 120 rpm at 200° C. for 2 hours)
2. Pigments and fillers added under high speed mixer
3. Added first emulsifier solution and mixed 4. Added second emulsifier solution under high speed mixer for 25 minutes
5. Added third emulsifier solution mixed high speed mixer for 15 minutes
6. Finished by passing over a three roll mill, as hereinbefore described (passed at 30 bars/435 psi to control water droplet size in the ink. If droplets are visible, the ink was passed again).

Example 3

Testing of the cyan inks of Example 2 gave the results listed in Table 10.

TABLE 10 evaluation of novel cyan inks versus a standard comparative cyan ink

|  | Standard comparative Cyan Ink | Cyan Ink A | Cyan Ink B | Cyan Ink C | Cyan Ink D |
|---|---|---|---|---|---|
| Viscosity | 227 Ps | 220 Ps | 227 Ps | 240 Ps | 190 Ps |
| Tack (300 rpm) | 9.7 | 9.2 | 8.9 | 9.3 | 8.6 |
| Tack stability tack max | 15.9 | 15.1 | 15.7 | 15.9 | 15.0 |
| Tack stability [sec] | 1100 | 860 | 860 | 970 | 950 |
| Mileage (gr/m$^2$) | 0.585 | 0.645 | 0.653 | 0.643 | 0.6 |
| Gloss | 43 | 45 | 41 | 49 | 45 |

TABLE 11 tack and tack stability values measured Inkomat 300 rpm at 30° C.

| SPEED | TIME | Standard cyan TACK | Emulsion Cyan A TACK | Emulsion Cyan B TACK | Emulsion Cyan C TACK | Emulsion Cyan D TACK |
|---|---|---|---|---|---|---|
| 50 m/min | 60 sec | 5.1 | 5.0 | 4.7 | 5.2 | 4.8 |
| 100 m/min | 15 sec | 6.5 | 6.3 | 6.0 | 6.4 | 6.1 |
| 200 m/min | 15 sec | 8.3 | 8.0 | 7.6 | 8.1 | 7.6 |
| 300 m/min | 15 sec | 9.7 | 9.2 | 8.9 | 9.3 | 8.6 |
| TACK STABILITY TIME(SEC) |  | 15.9 1100 | 15.1 860 | 15.7 860 | 16.0 970 | 15.0 750 |

TABLE 12 mileage values for the inks of Example 3

|  | film weight (g/m2) | Log (base 10) (m2/g) | actual density |
|---|---|---|---|
| Standard Cyan | 0.585 | −0.23284 | 1.45 |
| Novel Cyan A | 0.645 | −0.19044 | 1.44 |
| Novel Cyan B | 0.653 | −0.18509 | 1.45 |
| Novel Cyan C | 0.643 | −0.19179 | 1.45 |
| Novel Cyan D | 0.6 | −0.22185 | 1.45 |

The data of Tables 10 through 12 shows that it is possible to formulate an offset lithographic ink, for example, a heatset ink, with between 9 and 37% water which matches a conventional ink in rheology, gloss and mileage.

Additionally, density curves for the cyan inks, comparative and novel, were all comparable.

Example 4

This example demonstrates the incorporation of high quantities of both filler and water into heatset lithographic inks, without the use of emulsifiers. Table 13 shows the formulation of standard and novel yellow inks; Table 14, magenta inks; Table 15, cyan inks; and Table 16, black inks.

TABLE 13 formulation of conventional ("STD") and novel ("Innovation") conventionally curing yellow inks of the invention

| Product | STD Yellow | Innovation 20% | Innovation 30% |
|---|---|---|---|
| Yellow Flush | 32.5 | 32.5 | 32.0 |
| Orange Toner base | 0.3 | 0.3 | 0.3 |
| Magenta Flush |  |  |  |
| Cyan Flush |  |  |  |
| Kaolin Tint Base | 39.7 | 4.3 |  |
| Carbonate Tint Base |  | 16.5 | 16.0 |
| Organoclay Base | 1.5 |  | 10.0 |
| Mineral Oil Based Varnish | 18.0 | 10.4 |  |
| SoybeanAlkyd |  |  |  |
| Soyabean Oil |  | 7.0 | 7.0 |
| Heavy Oil |  | 4.0 | 4.0 |
| Distillate | 4.0 | 5.0 | 0.7 |
| Water | 4.0 | 20.0 | 30.0 |
|  | 100.0 | 100.0 | 100.0 |

TABLE 14 formulation of conventional ("STD") and novel "Innovation") conventionally curing magenta inks of the invention

| Product | STD Magenta | Innovation 20% | Innovation 30% |
|---|---|---|---|
| Yellow Flush |  |  |  |
| Orange Toner base |  |  |  |
| Magenta Flush | 30.0 | 30.0 | 30.0 |
| Cyan Flush |  |  |  |
| Kaolin Tint Base | 28.0 |  |  |
| Carbonate Tint Base | 15.0 | 17.5 | 16.0 |
| Organoclay Base | 3.0 |  |  |
| Mineral Oil Based Varnish | 20.5 | 16.0 | 14.0 |
| SoybeanAlkyd |  | 5.0 |  |
| Soyabean Oil |  | 6.0 | 6.0 |
| Heavy Oil |  | 5.0 | 4.0 |

TABLE 14-continued formulation of conventional ("STD") and novel "Innovation") conventionally curing magenta inks of the invention

| Product | STD Magenta | Innovation 20% | Innovation 30% |
|---|---|---|---|
| Distillate | 0.5 | 0.5 | |
| Water | 3.0 | 20.0 | 30.0 |
| | 100.0 | 100.0 | 100.0 |

TABLE 15 formulation of conventional ("STD") and novel "Innovation") conventionally curing cyan inks of the invention

| Product | STD Cyan | Innovation 20% | Innovation 30% |
|---|---|---|---|
| Yellow Flush | | | |
| Orange Toner base | | | |
| Magenta Flush | | | |
| Cyan Flush | 31.6 | 31.6 | 31.0 |
| Kaolin Tint Base | 27.2 | 4.3 | |
| Carbonate Tint Base | 15.0 | 20.0 | 18.0 |
| Organoclay Base | 1.0 | 1.0 | |
| Mineral Oil Based Varnish | 19.7 | 10.6 | 10.0 |
| SoybeanAlkyd | | | |
| Soyabean Oil | | 7.0 | 5.0 |
| Heavy Oil | | 4.0 | 4.0 |
| Distillate | 1.5 | 1.5 | 2.0 |
| Water | 4.0 | 20.0 | 30.0 |
| | 100.0 | 100.0 | 100.0 |

TABLE 16 formulation of conventional ("STD") and novel "Innovation") conventionally curing black inks of the invention

| Product | STD Black | Innovation 20% | Innovation 30% |
|---|---|---|---|
| Organclay Base | 2.0 | 0.8 | |
| Water | | 20.0 | 30.0 |
| Oil based Bitumen Solution | 13.0 | 15.5 | 12.0 |
| Carbon | 18.0 | 18.0 | 18.0 |
| Carbonate Tint Base | 16.5 | 16.0 | 16.0 |
| Heavy Oil | 34.0 | 15.5 | 14.0 |
| Distillate | | 3.7 | 3.0 |
| Mineral oil | 16.5 | 10.5 | 7.0 |
| | 100.0 | 100.0 | 100.0 |

Intermediates for the bases listed in Tables 12 through 15 were prepared as in Table 17:

TABLE 17 preparation of intermediates for the inks of Example 3.

| Intermediate | Anti-oxidant Solution | Varnish 1 Hydrocarbon resin | Varnish 2 Phenolic modified Rosin Resin | Carbonate Tint Base | Kaolin Tint Base | Organoclay Base | Orange Toner Base | Yellow Flush | Cyan Flush | Magenta Flush | Supplier |
|---|---|---|---|---|---|---|---|---|---|---|---|
| Soybean Oil | 87.5 | | | | | | | | | | Cargill |
| Linseed Oil | | 13.0 | | | | | | | | | Vandeputte |
| Kaolin Clay | | | | | 50.0 | | | | | | BASF |
| Bentone (Organoclay) | | | | | | 25.0 | | | | | Elementis |
| Clacium Carbonate | | | | 53.0 | | | | | | | Omya |
| Hydrocarbon Resin | | 65.0 | | 3.5 | 10.5 | | | | | | RRR |
| Phenolic Modified Rosin Resin | | | 42.0 | | | | | | | | Lawter |
| Mineral Oil | | | | 24.5 | 28.0 | | | 3.5 | | 19.0 | Nynas |
| Heavy Oil | | | | 19.0 | 11.5 | | | | | | Total |
| Distillate of Mineral Oil | | 35.0 | 44.0 | | | 75.0 | 10.5 | | | | Exxon |
| BHT | | | | | | | | | | 0.4 | Lawter |
| Dimeric BHT | 12.5 | | | | | | | | | | Chemtura |
| Antioxidant solution | | | 1.0 | | | 1.0 | 0.8 | 8.5 | | | Intermediate |
| Varnish 2 Phenolic modified | | | | | | | | 24.7 | 21.5 | | intermediate |
| Varnish 1 Hydrocarbon resin | | | | | | | | 40.5 | 21.5 | 39.5 | intermediate |
| Soybean Alkyd | | | | | | | 68.5 | 3.5 | 8.5 | | Lawter |
| Linseed Alkyd | | | | | | | | | | 4.5 | Lawter |

TABLE 17-continued preparation of intermediates for the inks of Example 3.

| Intermediate | Anti-oxidant Solution | Varnish 1 Hydrocarbon resin | Varnish 2 Phenolic modified Rosin Resin | Carbonate Tint Base | Kaolin Tint Base | Organoclay Base | Orange Toner Base | Yellow Flush | Cyan Flush | Magenta Flush | Supplier |
|---|---|---|---|---|---|---|---|---|---|---|---|
| Pigment Orange 13 | | | | | | | 20.0 | | | | Jiangsu |
| Pigment Blue 15:3 | | | | | | | | | 39.2 | | Asahi |
| Blue Synergist | | | | | | | | | 0.8 | | DIC |
| Pigment Yellow 12 | | | | | | | | 27.0 | | | SUNChemical |
| Pigment Red 57:1 | | | | | | | | | | 36.6 | SUNChemical |
| | 100.0 | 100.0 | 100.0 | 100.0 | 100.0 | 100.0 | 100.0 | 100.0 | 100.0 | 100.0 | |

The inks of Tables 13 through 16 were evaluated as described hereinbefore to, and found to be at least equivalent in performance to the standard ink, while containing very large qualities of water.

Examples 5-20

These examples demonstrate the utility of coldset in made according to the present invention. Table 18 shows the formulation of comparative yellow inks and inks of the present invention. Table 19 shows the preparation of the clay (filler) intermediate compound. Table 20 shows the formulation of comparative black inks and inks of the present invention. Table 21 shows the formulation of comparative cyan inks and inks of the present invention.

Table 21 shows the formulation of comparative yellow inks and inks of the present invention. Table 23 shows the sources of raw materials employed to make the sixteen examples. The results clearly demonstrate that the inks of this invention possess tack and colorimetric optical density equivalent to standard inks, yet have greatly superior mileage, ranging from an improvement of 3.7% through 9.7%, depending on the ink color and levels of both water and filler.

TABLE 18

Yellow Ink Coldset Examples

| Raw material | Example 5 (Comparative) | Example 6 (Comparative) | Example 7 | Example 8 |
|---|---|---|---|---|
| Yellow flush (Apollo YH-2618) | 28.00 | — | — | — |
| Yellow flush (Apollo YH-2855) | — | 27.00 | 27.00 | 27.00 |
| Orange toner (Apollo ORH-2825) | 0.30 | 0.60 | 0.60 | 0.60 |
| Tabset varnish (47% phenolic gel) | 32.00 | 16.00 | 22.50 | 22.00 |
| Soy gel varnish (22% soy, phenolic gel) | 4.50 | — | — | — |
| Free flow varnish (Resinall 7636) | 3.00 | 21.70 | 10.50 | — |
| [1](Clay compound | 8.50 | 15.00 | 20.00 | 35.00 |
| Microcrystalline compound (70% micro) | 5.00 | 5.00 | 5.00 | 5.00 |
| Bentone compound (35% organo clay) | 2.00 | 1.00 | 0.50 | 1.00 |
| Pale 16 - castor oil | 1.50 | 1.50 | 1.50 | 1.50 |
| Dimer acid (Unidyme 18) | 0.20 | 0.20 | 0.20 | 0.20 |
| Water | 3.00 | 4.00 | 6.00 | 5.00 |
| Calumet - M470 ink oil | 12.00 | 8.00 | 6.20 | 2.70 |
| Total | 100.00 | 100.00 | 100.00 | 100.00 |
| 1' Tack (one minute @ 1200 RPM | 4.9-5.5 | 4.9-5.5 | 4.9-5.5 | 4.9-5.5 |
| Viscosity (Laray Viscometer @2500 1/s) | 55-110 | 55-110 | 55-110 | 55-110 |
| Yield Value (Laray Viscometer @ 2.5 1/s) | 1150-2290 | 1150-2290 | 1150-2290 | 1150-2290 |
| Density | 1.00 | 0.99 | 1.00 | 1.00 |
| Weight (g) | 0.0109 | 0.0108 | 0.0105 | 0.0102 |
| Mileage | Standard | +1.0% | +3.7% | 6.5% |

Inks were high-speed mixed until homogenous.

TABLE 19 synthesis of the clay compound intermediate
[1]Clay Compound Formula

| | |
|---|---|
| Soy Oil (ARSO) | 21.0 |
| BHT Solution (22% BHT in soy oil) | 1.0 |
| Kaolin Clay (ASP 602) | 70.0 |

TABLE 19-continued synthesis of the clay compound intermediate
[1]Clay Compound Formula

| | |
|---|---|
| Maleated Soy Oil Dispersant | 8.0 |
| Total | 100.0 |

Soy oil, BHT solution and dispersant were added to a mixing vessel. Clay was added under continuous feed under low shear mixing. Once clay has been added, the compound was mixed under high shear until homogenous. Compound is then subjected to a Schold shot mill charged with 3/32 carbon steel shot and milled until dispersed to a mean micron size of about 1.4 microns.

TABLE 20

Black Coldset Ink Examples

| Raw materials | Example 9 (Comparative) | Example 10 (Comparative) | Example 11 (Inventive) | Example 12 (Inventive) |
|---|---|---|---|---|
| Black Base (21% SR301 Carbon) | 83.00 | — | — | — |
| Black Base (26.2% SR301 Carbon) | — | 64.00 | 64.00 | 64.00 |
| Insert varnish (45% phenolic gel) | — | 14.30 | 8.60 | 8.00 |
| Teflon Compound (35% PTFE) | 0.50 | — | — | — |
| Microcrystalline compound (70% micro) | — | 4.00 | 4.00 | 4.00 |
| [1]Clay compound | — | 7.00 | 10.00 | 15.00 |
| Bentone compound (35% organo clay) | 1.00 | — | — | — |
| Pale 16 - castor oil | 1.50 | — | — | — |
| Gelled Linseed Oil (8.5% fumed silica) | — | 5.00 | — | — |
| Petrolatum | — | 1.00 | 1.00 | — |
| Dimer Acid (Unidyme 18) | 1.00 | — | 0.20 | 0.20 |
| TOFA (Sylfat F1A) | — | 0.20 | 0.20 | — |
| Water Fighter (Optilith #3) | 0.25 | — | — | — |
| Linseed oil (ARLO) | — | 1.00 | 5.50 | 3.30 |
| Soy oil (ARSO) | 4.00 | — | — | — |
| MSO (mineral seal oil) | 3.00 | — | — | — |
| TXIB | — | 1.50 | 0.80 | — |
| Water | — | — | 4.00 | 4.00 |
| Calumet - M470 ink oil | 5.75 | — | — | — |
| Calumet - M500 ink oil | — | 2.00 | 1.70 | 1.50 |
| Total | 100.00 | 100.00 | 100.00 | 100.00 |
| 1' Tack (one minute @ 1200 RPM | 4.5-5.1 | 4.5-5.1 | 4.5-5.1 | 4.9-5.5 |
| Viscosity (Laray Viscometer @2500 1/s) | 85-135 | 45-85 | 45-85 | 155-110 |
| Yield Value (Laray Viscometer @ 2.5 1/s) | 1100-1800 | 910-1690 | 910-1690 | 1150-2290 |
| Density | 1.28 | 1.29 | 1.28 | 1.27 |
| Weight (g) | 0.0187 | 0.0183 | 0.0178 | 0.0176 |
| Mileage | Standard | +2.2% | +4.9% | +5.9% |

TABLE 21

Cyan Coldset Ink Examples

| Raw materials | Example 13 (Comparative) | Example 14 (Comparative) | Example 15 (Inventive) | Example 16 (Inventive) |
|---|---|---|---|---|
| Phthalo Cyan flush (32% Phthalo pigment) | 39.00 | 39.00 | 39.00 | 39.00 |
| Tabset varnish (47% phenolic gel) | 21.50 | 25.50 | 22.20 | 15.70 |

TABLE 21-continued

Cyan Coldset Ink Examples

| Raw materials | Example 13 (Comparative) | Example 14 (Comparative) | Example 15 (Inventive) | Example 16 (Inventive) |
|---|---|---|---|---|
| Soy gel varnish (22% soy, phenolic gel) | 10.00 | — | — | — |
| [1]Clay compound | 10.00 | 15.00 | 20.00 | 30.00 |
| Microcrystalline compound (70% micro) | 5.00 | 5.00 | 5.00 | 4.00 |
| Bentone compound (35% organo clay) | 1.50 | 1.00 | 1.00 | 1.00 |
| Orange Solid Oil | 3.00 | 2.00 | 2.00 | 1.00 |
| Pale 16 - castor oil | 1.00 | 1.00 | — | — |
| Dimer Acid (Unidyme 18) | — | — | 0.50 | 0.50 |
| Turkey Red Oil (TRO) | 0.30 | 0.30 | 0.30 | 0.30 |
| Water | — | 4.00 | 6.00 | 6.00 |
| Calumet - M470 ink oil | 8.70 | 7.20 | 4.00 | 2.50 |
| Total | 100.00 | 100.00 | 100.00 | 100.00 |
| 1' Tack (one minute @ 1200 RPM) | 4.9-5.5 | 4.5-5.1 | 4.5-5.1 | 4.5-5.1 |
| Viscosity (Laray Viscometer @2500 1/s) | 50-110 | 50-110 | 50-110 | 50-110 |
| Yield Value (Laray Viscometer @ 2.5 1/s) | 1100-2100 | 1100-2100 | 1100-2100 | 1100-2100 |
| Density | 1.10 | 1.11 | 1.10 | 1.10 |
| Weight (g) | 0.0114 | 0.0111 | 0.0105 | 0.0103 |
| Mileage | Standard | +2.7% | +7.9% | +9.7% |

TABLE 22

Magenta Coldset Ink Examples

| Raw materials | Example 17 (Comparative) | Example 18 (Comparative) | Example 19 (Inventive) | Example 20 (Inventive) |
|---|---|---|---|---|
| Lithol Rubine flush (Apollo RUH-2612) | 40.00 | — | — | — |
| Lithol Rubine flush (37% rubine pigment) | — | 37.00 | 37.00 | 37.00 |
| Tabset varnish (47% phenolic gel) | 17.75 | 33.00 | 31.00 | 20.00 |
| Soy gel varnish (22% soy, phenolic gel) | 10.10 | — | — | — |
| Free flow Phenolic varnish (42% resin solid) | 6.25 | — | — | — |
| [1]Clay compound | 10.00 | 15.00 | 20.00 | 30.00 |
| Microcrystalline compound (70% micro) | 5.00 | 5.00 | 5.00 | 5.00 |
| Bentone compound (35% organo clay) | 1.00 | — | — | 1.00 |
| Gelled Linseed Oil (8.5% fumed silica) | 1.00 | — | — | — |
| Turkey Red Oil (TRO) | 0.40 | 0.40 | 0.40 | 0.40 |
| Water | — | — | — | 4.00 |
| Calumet-M470 ink oil | 8.50 | 9.60 | 6.60 | 2.60 |
| Total | 100.00 | 100.00 | 100.00 | 100.00 |
| 1' Tack (one minute @ 1200 RPM) | 4.9-5.5 | 4.5-5.1 | 4.5-5.1 | 4.5-5.1 |
| Viscosity (Laray Viscometer @2500 1/s) | 55-110 | 50-110 | 50-110 | 50-110 |
| Yield Value (Laray Viscometer @ 2.5 1/s) | 1330-2470 | 980-1820 | 980-1820 | 980-1820 |
| Density | 1.10 | 1.10 | 1.10 | 1.10 |
| Weight (g) | 0.0082 | 0.0081 | 0.0078 | 0.0077 |
| Mileage | Standard | +1.3% | +4.9% | +6.1% |

TABLE 23 sources of raw materials for Examples 5 through 20

Yellow Ink Examples

| Description | Supplier |
|---|---|
| Yellow flush (Apollo YH-2618) | Apollo Colors |
| Yellow flush (Apollo YH-2855) | Apollo Colors |
| Orange toner (Apollo ORH-2825) | Apollo Colors |
| Tabset varnish (47% phenolic gel) | Sun Chemical - Hopkinsville |
| Soy gel varnish (22% soy, phenolic gel) | Sun Chemical - Hopkinsville |
| Free flow varnish (Resinall 7636) | Resinall Corporation |
| ¹Clay compound | Sun Chemical - Frankfort |
| Microcrystalline compound (70% micro) | Lubrizol Advanced Materials |
| Bentone compound (35% organo clay) | Custom Synthesis LLC |
| Pale 16 - castor oil | Roopal Packaging LLC |
| Dimer acid (Unidyme 18) | Arizona Chemical |
| Water | — |
| Calumet - M470 ink oil | Calumet Specialty Products |

| ¹Clay Compound Formula | Supplier |
|---|---|
| Soy Oil (ARSO) | Archer Daniels Midland |
| BHT Solution (22% BHT in soy oil) | Merisol USA LLC |
| Kaolin Clay (ASP 602) | BASF Corp |
| Maleated Soy Oil Dispersant | Ethox Chemicals LLC |

| Description | Supplier |
|---|---|

Black Ink Examples

| | |
|---|---|
| Black Base (21% SR301 Carbon) | Sun Chemical - Frankfort |
| Black Base (26.2% SR301 Carbon) | Sun Chemical - Frankfort |
| Insert varnish (45% phenolic gel) | Sun Chemical - Hopkinsville |
| Teflon Compound (35% PTFE) | Custom Synthesis LLC |
| Microcrystalline compound (70% micro) | Lubrizol Advanced Materials |
| ¹Clay compound | Sun Chemical - Frankfort |
| Bentone compound (35% organo clay) | Custom Synthesis LLC |
| Pale 16 - castor oil | Roopal Packaging Inc |
| Gelled Linseed Oil (8.5% fumed silica) | Alvar Inc |
| Petrolatum | Calumet Lubricants |
| Dimer Acid (Unidyme 18) | Arizona Chemical |
| TOFA (Sylfat F1A) | Arizona Chemical |
| Water Fighter (Optilith #3) | Lawter |
| Linseed oil (ARLO) | Archer Daniels Midland |
| Soy oil (ARSO) | Archer Daniels Midland |
| MSO (mineral seal oil) | Calumet |
| TXIB | Nexeo Solutions |
| Water | — |
| Calumet - M470 ink oil | Calumet Specialty Products |
| Calumet - M500 ink oil | Calumet Specialty Products |

TABLE 23-continued sources of raw materials for Examples 5 through 20

Cyan Ink Examples

| | |
|---|---|
| Phthalo Cyan flush (32% Phthalo pigment) | Apollo Colors |
| Tabset varnish (47% phenolic gel) | Sun Chemical - Hopkinsville |
| Soy gel varnish (22% soy, phenolic gel) | Sun Chemical - Hopkinsville |
| ¹Clay compound | Sun Chemical - Frankfort |
| Microcrystalline compound (70% micro) | Lubrizol Advanced Materials |
| Bentone compound (35% organo clay) | Custom Synthesis LLC |
| Orange Solid Oil | Famous Lubricants |
| Pale 16 - castor oil | Roopal Packing LLC |
| Dimer Acid (Unidyme 18) | Arizona Chemical |
| Turkey Red Oil (TRO) | Afton Chemical Corp |
| Water | — |
| Calumet - M470 ink oil | Calumet Specialty Products |

Magenta Ink Examples

| | |
|---|---|
| Lithol Rubine flush (Apollo RUH-2612) | Apollo Colors |
| Lithol Rubine flush (37% rubine pigment) | Apollo Colors |
| Tabset varnish (47% phenolic gel) | Sun Chemical - Hopkinsville |
| Soy gel varnish (22% soy, phenolic gel) | Sun Chemical - Hopkinsville |
| Free flow Phenolic varnish (42% resin solid) | Sun Chemical - Hopkinsville |
| ¹Clay compound | Sun Chemical - Frankfort |
| Microcrystalline compound (70% micro) | Lubrizol Advanced Materials |
| Bentone compound (35% organo clay) | Custom Synthesis LLC |
| Gelled Linseed Oil (8.5% fumed silica) | Alvar Inc. |
| Turkey Red Oil (TRO) | Afton Chemical Corp |
| Water | — |
| Calumet - M470 ink oil | Calumet Specialty Products |

Yellow Ink Examples

| | |
|---|---|
| Yellow flush (Apollo YH - 2618) | Apollo Colors |

Further, piling of the inks of examples 5 through 20 was assessed by printing Example 6 (comparative ink) and the Example 8 (ink of the present invention) under the following conditions on a Didde Offset Press:
 a) Press Speed: 400-1000 ft/minute
 b) Fount: ACFS 193, 4 oz/gallon
 c) Paper: 30# Bowater newsprint
 d) Inks: Example 2 (comparative); Example 4 (inventive)
 e) Press Room: 68° F.; 34% relative humidity
 f) Water setting at 400 FPM is 58 for Example 6; 60 for Example 8
 g) Print density is 85/85 for Example 2; 87/91 for Example 4 (DIN Method)

Piling was assessed on a visual basis and rated as 1-10, with 1-3 being minimal or slight piling; 4-6 being moderate piling; and 7-10 being severe piling. Upon visual inspection, Example 2 (comparative) was rated as 8, while Example 4 (Inventive) was rated as 3.

Example 21

This is a general example describing a typical experimental protocol for assessing ink transfer and other performance parameters for energy-curable inks of the present invention on the Mitsubishi press simulator is as follows: The roller speed is set to 300 meters per minute, with roller temperature maintained at 30° C. Dampening and ink setting are adjusted so that the press runs stably at a constant film weight of 2.5 µm, measured at the sensor located between the final ink oscillating roller and the two ink forme rollers. The four oscillating rollers are equipped with sensors determining the ink film thickness and the water content and the plate cylinder is equipped with a high-speed camera with a microscope to control the dot shape and the conditions under which the plate runs free. When the press runs stably, the transferred ink on the ductor roller is scraped off for a defined time and the collected ink is measured on a laboratory balance. By this method, it can be assessed whether an ink under identical print conditions, such as ink and fountain settings, temperature, and roller speed, can provide a higher transfer, which is measured by the amount of ink scraped off on the ductor roller.

A variety of inks with and without emulsification were measured, as exemplified in Examples 18-34. The emulsified energy curable inks of the present invention exhibited improved transfer vs. non-emulsified comparative inks.

If an ink is emulsified with water, viscosity is usually reduced. When the emulsified ink leaves the ink duct on the printing press in the upper part of the ink train, some portion of emulsified water may be lost due to evaporation from the thin ink film, depending on the roller temperature and roller speed. In the lower area of the ink train, the pre-emulsified ink is further emulsified with fountain solution and a balance is very quickly achieved. The inks of the present invention therefore exhibit, besides good transfer, also a fast start-up on press.

Measurements of the emulsified water content by Carl-Fisher titration showed that the inks which are collected at the ductor roller on the offset print simulator, have a similar amount of emulsified water, regardless whether the starting ink contained a lower or higher amount of emulsified water. Nonetheless, the inks with were pre-emulsified exhibit a higher transfer, compared to the non-emulsified inks, which is highly unexpected. One may argue that viscosity may have an influence on the amount of transferred ink as at the same ink duct settings with a less viscous ink, more ink may leave the ink duct per time, giving an enhanced ink flow and therefore a better transfer per time.

To investigate this effect, experimental inks were prepared (Examples 35-61) on the three roll mill in which some acrylic trifunctional monomer was taken out and replaced by water, so that the viscosity of Standard ink and emulsified ink is comparable. Nonetheless, despite the similar viscosity, the emulsified inks exhibit an enhanced transfer compared to the non-emulsified inks. The effect was also observed with different inert ink vehicles such as an aldehyde-ketone resin or a rosin resin or a hydrocarbon resin (Examples 35-43). The observed increased transfer of the emulsified energy curable inks was therefore not foreseeable or predictable and would not have been anticipated by a person skilled in the art.

Examples 22-38

Water was emulsified into yellow, magenta and cyan offset inks from the Sun Chemical SunCure™ UV-ink product range with a tri-foil butterfly stirrer with a speed of 1750 rpm for 10 minutes. During the emulsification, the temperature increased up to 45-55° C.

The result of the emulsification was evaluated with DSC. All inks had a peak maximum below –40° C. in DSC.

The inks were then run on the Mitsubishi offset print simulator under identical conditions for each set of inks with a starting dampening setting of 30%. Fountain solution is SunFount™ SF480 at 1%+5% IPA+0.5% re-hardener; roller speed is 300 meter/minute; plates are heatset computer to plate baked; temperature of rollers is 30° C.; temperature of fountain solution is 11-12° C.; ink roller setting is 10-12%. During the run, the transferred ink was removed from the ductor roller and compared in weight to comparative samples without emulsified water.

In Table 24 below, emulsified inks were compared against non-emulsified inks, otherwise having an identical formulation. The inks are characterized by viscosity, tack and the maximum peak temperature for emulsified water in DSC. All inks which contain emulsified water, show increased transfer of ink (last column), measured with the offset print simulator versus the non-emulsified comparative inks.

TABLE 24 comparison between conventional and water-containing lithographic energy-curing inks

| Example | Lithographic energy curable ink | Amount of emulsified water in ink [weight %] | Initial viscosity (D = 50 s$^{-1}$ @25° C.) [PaS] | DSC Peak maximum of emulsified water in ink [° C.] | Tack @150 rpm @30° C. [tack-o-scope units] | Transferred ink [g] |
|---|---|---|---|---|---|---|
| 22 | Yellow 1 (comparative) | 0 | 29.5 | — | 260 | 78 |
| 23 | Yellow 1 | 6 | 20.9 | –50 | 284 | 89 |
| 24 | Magenta 1 (comparative) | 0 | 25.1 | — | 306 | 78 |
| 25 | Magenta 1 | 3 | 16.3 | –46 | 318 | 115 |
| 26 | Magenta 1 | 6 | 18.1 | –44 | 325 | 120 |
| 27 | Cyan 1 (comparative) | 0 | 24.5 | — | 273 | 90 |
| 28 | Cyan 1 | 3 | 16.0 | –50 | 284 | 150 |
| 29 | Cyan 1 | 6 | 16.1 | –49 | 291 | 165 |
| 30 | Yellow 2 (comparative) | 0 | 32.2 | — | 244 | 53 |

TABLE 24-continued comparison between conventional and water-
containing lithographic energy-curing inks

| Example | Lithographic energy curable ink | Amount of emulsified water in ink [weight %] | Initial viscosity (D = 50 s$^{-1}$ @25° C.) [PaS] | DSC Peak maximum of emulsified water in ink [° C.] | Tack @150 rpm @30° C. [tack-o-scope units] | Transfered ink [g] |
|---|---|---|---|---|---|---|
| 31 | Yellow 2 | 3 | 16.2 | −47 | 248 | 83 |
| 32 | Yellow 2 | 6 | 15.8 | −45 | 253 | 85 |
| 33 | Magenta 2 (comparative) | 0 | 32.2 | — | 228 | 62 |
| 34 | Magenta 2 | 3 | 26.9 | −47 | 230 | 128 |
| 35 | Magenta 2 | 6 | 27.2 | −45 | 242 | 170 |
| 36 | Cyan 2 (comparative) | 0 | 25.0 | — | 249 | 115 |
| 37 | Cyan 2 | 3 | 12.0 | −53 | 257 | 120 |
| 38 | Cyan 2 | 6 | 12.0 | −48 | 262 | 145 |

Test protocols for the assessment of the inks of Table 24 were as follows:
a) Viscosity: Cone & plate rheometer RCS 300 from Anton Paar company Germany, The inks are sheared with an increasing shear rate of D=2 to 100 1/s and the value for viscosity at a shear rate of 50 1/s.
b) Tack: Measured with calibrated "Tack-o-scope" instrument (Model 2001) from IGT testing systems, Netherlands. 1 ml of ink is placed on the EPDM rubber distribution roller 30° C., distributed for 90 seconds at a roller speed of 50 rpm, then 30 seconds at 300 rpm. Then the tack value is taken at a roller speed of 150 rpm.
c) Peak maximum of emulsified water in DSC:
  Equipment utilized was as follows:
    PC containing software for the DSC
    DSC Cell200 (Netzsch Company)
    DSC Interface TASC 414/3 (Netzsch Company)
    Dewar container for liquid Nitrogen
    Analytical balance
    Aluminum Pans+Lids 25 μL (T$_{max.}$ 600° C.)
    Aluminum Pans Press
    Spatula
  Procedure:
  1. On the analytical balance, ~20 mg (±2 mg) of ink sample was measured into an aluminum-pan. Ink should be in the middle of the aluminum-pans, not on upper end of the walls.
  2. The pan is closed with a lid and sealed with the press.
  3. The pan is placed into the measuring cell. A second empty Al-pan is placed into the reference cell.
  4. The chamber is closed.
  5. The sensitivity of the measurement cell is set to 100%.
  6. The program is started:
  Start: at 25° C., Step 1: cool with a rate of 10K/min. to −80° C. under Nitrogen sparge (~20-25 mL/min.); Step 2: re-heating with a rate of 10K/min. to 25° C. under nitrogen sparge (~20-25 mL/min.)
  7. After measurement the peaks in the range of −80° C. to 0° C. are evaluated.

Examples 39 Through 41

The inks of Table 24 were produced as in the general principle delineated in Table 25. As an example of the general preparation, the preparation of three cyan lithographic inks is illustrated. These were made on a three roll mill under a roller pressure of 12 atmospheres (atm) which equals 1.0133×12 bar or 1,0133×10$^5$×12 Pascal (Pa) at a roller temperature of 25° C. The inks were passed three times over the mill until the grindometer shows less than 2 lines below 4 μm which was considered a good grind. The inks differ in the amount of trifunctional acrylic monomer in order to compensate the viscosity for the added water. Into two inks, 3.5% (Example 40) and 5% (Example 41) of water was emulsified. Example 39 is comparative and does not contain emulsified water. In this way, almost the same viscosity was achieved in all three inks. Then, the inks were run on the offset print simulator under the same conditions as in General Example 21 (except an ink duct setting of 5% for all inks) and the transfer is measured.

TABLE 25 preparation of energy-curing cyan inks

| Example | 39 comparative cyan [weight %] | 40 cyan [weight %] | 41 cyan [weight %] |
|---|---|---|---|
| Aldehyde varnish* | 45.50 | 45.50 | 45.00 |
| Water | — | 3.50 | 5.50 |
| Trifunctional acrylic monomer | 5.50 | 2.00 | 0.00 |
| Acrylic oligomer** | 10.00 | 10.00 | 10.00 |
| Photoinitiator blend | 12.50 | 12.50 | 12.50 |
| Stabilizer | 1.00 | 1.00 | 1.00 |
| Extender | 3.00 | 3.00 | 3.00 |
| Leveling agent | 0.50 | 0.50 | 0.50 |
| Pigment Blue 15:3 | 21.50 | 21.50 | 21.50 |
| Total | 99.5 | 99.5 | 99.0 |
| Viscosity [Pa * s] @50 s$^{-1}$ | 31.56 | 31.89 | 30.56 |
| Transferred ink [g] | 34 | 78 | 79 |

Notes for Table 19:
*48% solution of inert aldehyde resin in acrylic trifunctional monomer;
**oil-modified polyester acrylate Examples 40 and 41, which contain emulsified water, show increased transfer of ink), as measured by the Mitsubishi offset print simulator versus the non-emulsified comparative Example 39.

Examples 42-45

Four cyan lithographic inks were made on the three roll mill with a roller pressure of 12 atm which equals 1.0133×12 bar or 1,0133×10$^5$×12 Pascal (Pa) at a roller temperature of 25° C. The inks were passed three times over the mill until the grindometer shows less than 2 lines below 4 μm which was considered as a good grind. The inks differ in amount of trifunctional acrylic monomer and type of resin in the varnish. Then, into two inks (Examples 43 and 45), 5% of water was emulsified. Examples 42 and 44 are comparative and do not contain emulsified water. In this way, almost the same viscosity was achieved in all inks. Then, the inks were run on the offset print simulator under the same conditions as in General Example 21 and the transfer is measured. The preparation of the inks is shown in Table 26.

TABLE 26 preparation of energy-curable cyan inks 42 through 45

| Example | 42 comparative cyan | 43 cyan | 44 Comparative cyan | 45 cyan |
|---|---|---|---|---|
| Hydrocarbon varnish* | 45.50 | 45.00 | | |
| Rosinester varnish** | | | 45.50 | 45.00 |
| Water | | 5.00 | | 5.00 |
| Acrylic monomer | 5.50 | 2.00 | 5.50 | 2.00 |
| Polyester acrylate | 10.00 | 9.00 | 10.00 | 9.00 |
| Photoinitiator blend | 12.50 | 12.50 | 12.50 | 12.50 |
| In-can stabilizer | 1.00 | 1.00 | 1.00 | 1.00 |
| Extender | 3.00 | 3.00 | 3.00 | 3.00 |
| Leveling agent | 0.50 | 0.50 | 0.50 | 0.50 |
| Pigment Blue 15:3 | 21.50 | 21.50 | 21.50 | 21.50 |
| Total | 99.5 | 99.5 | 99.5 | 99.5 |
| Viscosity [Pa * s] @50 s$^{-1}$ | 36.30 | 36.49 | 31.79 | 36.74 |
| Tack 150 | 218 | 288 | 320 | 397 |
| Flow in cm after 15 min. | 2.5 | 2 | 6 | 6 |
| Transferred ink [g] | 92 | 170 | 83 | 150 |

Notes for Table 26:
*42% solution in acrylic monomer,
**45% solution in acrylic monomer In the table above, emulsified ink Examples 43 and 45, were compared against non-emulsified ink Examples 42 and 44 having an almost identical viscosity. Examples 43 and 45, which contain emulsified water, show increased transfer of ink, as illustrated in Table 26, when evaluated on the Mitsubishi offset print simulator, versus the non-emulsified Comparative Examples 42 and 44.

Example 43 and 45 inks were also tested on a Didde Offset Web press (GSS, Graphic Systems Services). Again, the emulsified inks showed improved transfer as indicated by the reduced ink duct settings to get the same optical density (inks notches vs. the Standard). The optical density is measured by an online densitometer installed on the Didde press and confirmed later by a "SpectroEye" spectral photometer from Gretag-MacBeth Company. Table 27 below gives the ink settings for the same optical density.

TABLE 27 optical density comparison of standard and novel energy curing lithographic inks after printing

| Example | 28 comparative cyan | 43 cyan | 45 cyan |
|---|---|---|---|
| Ink notches | 3 | 1 | 1 |

It should also be noted that, at the same optical density, a lower ink duct setting was required for the emulsified inks 43 and 45, than for comparative ink 28, indicating a higher ink transfer for the inks of this invention.

Examples 46-47

These examples delineate useful electron-beam (EB) curable lithographic inks of the present invention. An emulsified cyan ink containing 9.4 weight % of emulsified water (Example 47) was tested against a comparative EB ink without emulsified water (Example 46). Both inks were run on the Mitsubishi offset print simulator under identical conditions with a starting dampening setting of 30%. Fountain solution is SunFount™ SF480 at 3%+5% IPA+0.5% re-hardener; Roller speed is 300 m/min; Plates are Heatset computer to plate baked; temperature of rollers is 30° C.; temperature of fountain solution is 11-12° C.; Ink roller setting is 5%. During the run, the transferred ink was removed from the doctor roller and compared in weight as shown in Table 28.

TABLE 28 comparison between conventional EB-curing lithographic cyan ink and energy-curable ink containing water

| Example | 46 comparative cyan | 47 cyan |
|---|---|---|
| Viscosity @ 50 s$^{-1}$ [Pa · s] | 23.85 | 21.84 |
| Tack [tack-o-scope units] | 195 | 225 |
| Flow after 15 minutes [cm] | 8.5 | 5.0 |
| Water content (determined by Karl Fischer titration) [%] | 0.3 | 9.4 |
| Transferred ink [g] | 76 | 110 |

Viscosity, tack and flow are measured as aforementioned. As shown in the table above the emulsified ink shows an increased transfer.

Example 48

Coldset inks containing up to 40% included water. Table 29 shows standard yellow inks versus those of this invention; table 30 shows standard magenta inks versus those of this invention; Table 31 shows standard cyan inks versus those of this invention. The intermediate compounds described in tables 29 through 31 were prepared as shown in table 17.

TABLE 29 formulation of a commercial coldset yellow ink
BCY 3250 series versus yellow inks of this invention

| NAME | BCY 3250 | Innovation 10% | Innovation 25% | Innovation 40% |
|---|---|---|---|---|
| D73B562: COLDSET YELLOW 12: B450 | 25.2 | 25.2 | 25.2 | 25.2 |
| D76B013: ORANGE 13: LT01 | 0.3 | 0.3 | 0.3 | 0.3 |
| Laca CS 200-44 | 47.5 | | | |
| CALOFORT SV 53% | | 20.0 | 20.0 | 18.0 |
| MINERAL VARNISH M3120 | 20.0 | 23.2 | 17.4 | 5.4 |
| REFINED SOYBEAN OIL | | 7.0 | 7.0 | 10.0 |
| SCRIPTANE NW50 SRD: BULK | | 4.0 | 4.0 | |
| EXXPRINT T82A | 3.0 | 5.0 | 5.0 | |
| NYTEX 810 | | 5.0 | | |
| TAP WATER | 4.0 | 10.0 | 20.0 | 40.0 |
| SPAN 83 | | 0.3 | 0.3 | 0.3 |
| SYLVAROS DSR 215 | | | 0.8 | 0.8 |
| | 100.00 | 100.00 | 100.00 | 100.00 |

TABLE 30 formulation of a commercial coldset magenta ink
BCY 3250 series versus magenta inks of this invention

| NAME | BCM 3250 | Innovation 10% | Innovation 20% | Innovation 40% |
|---|---|---|---|---|
| FLUSH MAGENTA D19-2563: BULK | 30.0 | 30.0 | 30.0 | 30.0 |
| Laca CS 200-44 | 32.5 | | | |
| CALOFORT SV 53% | 15.0 | 22.0 | 17.5 | 17.0 |
| BENTONE V024 | 3.0 | | | |
| MINERAL VARNISH M3120 | 16.0 | 20.4 | 14.9 | 5.0 |
| CHS Alkyd | | 5.0 | 5.0 | |
| REFINED SOYBEAN OIL | | 6.0 | 6.0 | 6.4 |
| SCRIPTANE NW50 SRD: BULK | | 5.0 | 5.0 | |
| TAP WATER | 3.0 | 10.0 | 20.0 | 40.0 |
| ANTI DRYING SOLUTION 1209 | 0.5 | 0.5 | 0.5 | 0.5 |
| SPAN 83-LQ-(RB) | | 0.3 | 0.3 | 0.3 |
| SYLVAROS DSR 215 | | 0.8 | 0.8 | 0.8 |
| | 100.00 | 100.00 | 100.00 | 100.00 |

TABLE 31 formulation of a commercial coldset cyan ink BCY
3250 series versus magenta inks of this invention

| NAME | BCC 3250 | Innovation 10% | Innovation 20% | Innovation 40% |
|---|---|---|---|---|
| D49B598 ALARG: COLDSET BLUE 15:3: B370 | 24.5 | 24.5 | 24.5 | 24.5 |
| Laca CS 200-44 | 31.5 | | | |
| CALOFORT SV 53% | 15.0 | 30.0 | 21.5 | 20.0 |
| BENTONE V024 | 1.0 | 1.0 | 3.0 | 2.4 |
| MINERAL VARNISH M3120 | 22.5 | 20.0 | 18.9 | 5.0 |
| SOYA OIL | | 7.0 | 7.0 | 7.0 |
| SCRIPTANE NW50 SRD: BULK | | 4.0 | 4.0 | |
| EXXPRINT T82A | 1.5 | 2.4 | | |
| TAP WATER | 4.0 | 10.0 | 20.0 | 40.0 |
| SPAN 83-LQ-(RB) | | 0.3 | 0.3 | 0.3 |
| SYLVAROS DSR 215 | | 0.8 | 0.8 | 0.8 |
| | 100.00 | 100.00 | 100.00 | 100.00 |

This example demonstrates formulae comparing a standard coldset ink containing 3-4% water and inks of this invention (described in the tables as "innovation" inks), "innovation" inks containing 10-40% water. Print performance of the inventive inks is equivalent to standard inks using lab testing equipment as described above. This example shows that water may be added to coldset lithographic inks while simultaneously reducing the level of VOCs and mineral oils without any negative impact on printing performance.

The invention has been described in terms of preferred embodiments thereof, but is more broadly applicable as will be understood by those skilled in the art. The scope of the invention is only limited by the following claims.

What is claimed is:

1. A process for manufacturing an emulsified ink suitable for printing by lithography, the process comprising the steps of:
    a. combining 8-15 wt % of at least one filler, one or more resin and one or more pigment or colorant to form a premilled ink, and
    b. adding 10-40 wt % water to said premilled ink, with stirring under sufficient shear that the water is emulsified, and maintaining the temperature of the operation below about 60° C. and further comprising the step of adding one or more emulsifying agents, together or sequentially, when said water is being mixed with said premilled ink.

2. The process of claim 1, wherein the water is at least 90 wt % present as a stable water-in-oil emulsion.

3. The process of claim 1 further comprising adding at least one agent selected from the group consisting of: emulsifying agent, wax, dispersing aid, photocrosslinkable ethylenically unsaturated monomer, ethylenically unsaturated oligomer, photoinitiator, organic solvent, and triglyceride oil.

4. The process of claim 1, wherein the filler is selected from a group consisting of: calcium carbonate, clay, talc, magnesium carbonate and silica.

5. The process of claim 1, wherein the resin is selected from the group consisting of: hydrocarbons, hybrid resins as a hydrocarbon/rosin blend, aldehyde resins, alkyd resins, maleic modified rosin esters, and phenolic modified rosin esters.

6. The process of claim 1, wherein the pigment or colorant is selected from the group consisting of: azo dyes, anthraquinone dyes, xanthene dyes, azine dyes, and combinations thereof, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, iron oxide, chromium oxide, ferric ammonium ferrocyanide, ferric oxide black, Pigment White 6, Pigment White 7 and Pigment Black 7.

7. An emulsified energy-curable ink suitable for printing by lithography having a viscosity of about 5-100 PaS at a shear rate of about D=50 1/s comprising:
   a. about 5-30 wt % of an acrylic monomer;
   b. about 5-30 wt % of an acrylic oligomer;
   c. about 0-25 wt % of an inert resin;
   d. about 5-25 wt % of one or more colorant or pigment;
   e. about 0-20 wt % of a photoinitiator;
   f. about 2-20 wt % of water;
   g. about 3-10 wt % of fillers;
   h. about 0-4 wt % of additives; and
   i. one or more photocrosslinkable compounds,
   characterized in that the ink shows a peak maximum of below −40° C. for emulsified water, measured by differential scanning calorimetry (DSC) at a cooling rate of 10° C./minute.

8. The ink of claim 7, characterized in that the water in the ink is predominantly emulsified water with a ratio of emulsified water to free water of greater than 9:1, measured by the ratio of integrated areas of heat flow in differential scanning calorimetry at 0 to −20° C. and −30 to −60° C., measured with a cooling rate of 10° C./minute.

9. The ink of claim 7, characterized in that the emulsified water having greater than 90% of water droplets having a size of less than 13 μm.

10. The ink of claim 7, characterized in that the ink exhibits an improved transfer of 5-100% compared to the same formulation without emulsified water, measured by the collected ink on an offset print simulator, as supplied by Mitsubishi.

11. The ink of claim 7, characterized in that the inks have less than 6% of emulsified water and do not contain water-soluble inorganic salts or emulsifiers with an HLB value of 2-18 and do not contain water soluble monomers and resins.

12. The ink of claim 7, wherein the pigment or colorant is selected from the group consisting of: azo dyes, anthraquinone dyes, xanthene dyes, azine dyes, and combinations thereof, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, iron oxide, chromium oxide, ferric ammonium ferrocyanide, ferric oxide black, Pigment White 6, Pigment White 7 and Pigment Black 7.

13. The ink of claim 7, wherein the filler is selected from a group consisting of: calcium carbonate, clay, talc, magnesium carbonate and silica.

14. A process for manufacturing an emulsified ink suitable for printing by lithography, comprising the steps of:
   a. combining 10-30 wt % of at least one filler, one or more resin and one or more pigment or colorant to form a premilled ink, and
   b. adding 1-10 wt % water to said premilled ink, with stirring under sufficient shear that the water is emulsified, and maintaining the temperature of the operation below about 60° C.

15. The process of claim 14, wherein the water is at least 90% present as a stable water-in-oil emulsion.

16. The process of claim 14 further comprising adding at least one agent selected from the group consisting of: emulsifying agent, wax, dispersing aid, photocrosslinkable ethylenically unsaturated monomer, ethylenically unsaturated oligomer, photoinitiator, organic solvent, and triglyceride oil.

17. The process of claim 14, wherein the at least one filler is selected from a group consisting of: calcium carbonate, clay, talc, magnesium carbonate and silica.

18. The process for manufacturing an ink according to claim 14, further comprising the step of adding one or more emulsifying agents, together or sequentially, when said water is being mixed with said premilled ink.

19. The process of claim 14, wherein the one or more pigment or colorant is selected from the group consisting of: azo dyes, anthraquinone dyes, xanthene dyes, azine dyes, and combinations thereof, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, iron oxide, chromium oxide, ferric ammonium ferrocyanide, ferric oxide black, Pigment White 6, Pigment White 7 and Pigment Black 7.

20. The process of claim 14, wherein the one or more resin is selected from the group consisting of: hydrocarbons, hybrid resins as a hydrocarbon/rosin blend, aldehyde resins, alkyd resins, maleic modified rosin esters, and phenolic modified rosin esters.

21. A process for manufacturing an emulsified energy-curable ink suitable for printing by lithography having a viscosity of about 5-100 PaS at a shear rate of about D=50 1/s, comprising the steps of:
   a. combining about 5-30 wt % of an acrylic monomer, about 5-30 wt % of an acrylic oligomer, about 0-25 wt % of an inert resin, about 3-10 wt % of at least one filler, one or more photocrosslinkable compound, about 0-20 wt % of a photoinitiator, about 0-4 wt % of additives and about 5-25 wt % of one or more pigment or colorant to form a premilled ink, and
   b. adding about 2-20 wt % water to said premilled ink, with stirring under sufficient shear that the water is emulsified, and maintaining the temperature of the operation below about 60° C.,
   characterized in that the ink shows a peak maximum of below −40° C. for emulsified water, measured by differential scanning calorimetry (DSC) at a cooling rate of 10° C./minute.

22. The process for manufacturing an ink according to claim 21, further comprising the step of adding one or more emulsifying agents, together or sequentially, when said water is being mixed with said premilled ink.

* * * * *